United States Patent [19]

Gilson et al.

[11] 4,241,519
[45] Dec. 30, 1980

[54] FLIGHT SIMULATOR WITH SPACED VISUALS

[75] Inventors: Richard D. Gilson; Marlin O. Thurston, both of Columbus; Karl W. Olson, Worthington; Ronald W. Ventola, Columbus, all of Ohio

[73] Assignee: The Ohio State University Research Foundation, Columbus, Ohio

[21] Appl. No.: 6,333

[22] Filed: Jan. 25, 1979

[51] Int. Cl.$^2$ .......................... G09B 9/08; H04N 7/18
[52] U.S. Cl. ...................................... 434/43; 358/104
[58] Field of Search ...................... 35/12 N; 358/104; 340/27 NA, 27 AT

[56] References Cited

U.S. PATENT DOCUMENTS

| | | | |
|---|---|---|---|
| 2,975,671 | 3/1961 | Hemstreet | 358/104 X |
| 2,988,821 | 6/1961 | Bolie | 35/12 N X |
| 3,060,596 | 10/1962 | Tucker et al. | 35/12 N X |
| 3,081,557 | 3/1963 | Mailhot | 35/12 N |
| 3,091,662 | 5/1963 | Hemstreet | 358/104 |
| 3,098,929 | 7/1963 | Kirchner | 35/12 N X |
| 3,242,493 | 3/1966 | Westerback | 340/27 NA X |
| 3,261,912 | 7/1966 | Hemstreet | 358/104 |
| 3,281,529 | 10/1966 | Hemstreet | 358/104 |
| 3,309,659 | 3/1967 | Balding | 340/27 NA |
| 3,418,459 | 12/1968 | Purdy et al. | 35/12 N X |
| 3,439,105 | 4/1969 | Ebeling et al. | 35/12 N X |
| 3,520,994 | 7/1970 | McAfee et al. | 358/104 |
| 3,605,083 | 9/1971 | Kramer | 340/27 NA |
| 3,643,213 | 2/1972 | Yurasek et al. | 340/27 NA |
| 3,643,258 | 2/1972 | Balding | 340/27 NA X |
| 3,665,408 | 5/1972 | Erdahl et al. | 340/27 NA X |
| 3,716,866 | 2/1973 | Mason | 340/27 NA X |
| 3,725,563 | 4/1973 | Woycechowsky | 35/12 N X |
| 3,833,759 | 9/1974 | Yatabe et al. | 35/12 N X |
| 3,911,597 | 10/1975 | Millard et al. | 35/12 N |
| 3,911,597 | 10/1975 | Millard et al. | 35/12 N |
| 3,996,673 | 12/1976 | Vorst et al. | 35/12 N X |
| 3,999,007 | 12/1976 | Crane | 358/104 |
| 4,054,917 | 10/1977 | Race | 35/12 N X |

FOREIGN PATENT DOCUMENTS 1446334  8/1976  United Kingdom .................... 35/12 N

OTHER PUBLICATIONS

"Visual Elements in Flight Simulation", Brown, *Aviation Space and Environmental Medicine*, vol. 47, Sep. 1976, pp. 913-924.

"The Approach and Landing: Cues and Clues to a Safe Touchdown", Hasbrook, A. H., *Business and Commercial Aviation*, Nov. 1975, pp. 39-43.

"Use of a Visual Landing System in Primary Flight Training", Young et al., *Proceedings of the 17th Annual Meeting of the Human Factor Society*, 1973.

*Primary Examiner*—William H. Grieb
*Attorney, Agent, or Firm*—Millard, Cox & Smith

[57] ABSTRACT

A flight simulator arrangement wherein a conventional, movable base flight trainer is combined with a visual cue display surface spaced a predetermined distance from an eye position within the trainer. Thus, three degrees of motive freedom (roll, pitch and crab) are provided for a visual proprioceptive, and vestibular cue system by the trainer while the remaining geometric visual cue image alterations are developed by a video system. A geometric approach to computing runway image eliminates a need to electronically compute trigonometric functions, while utilization of a line generator and designated vanishing point at the video system raster permits facile development of the images of the longitudinal edges of the runway.

41 Claims, 32 Drawing Figures

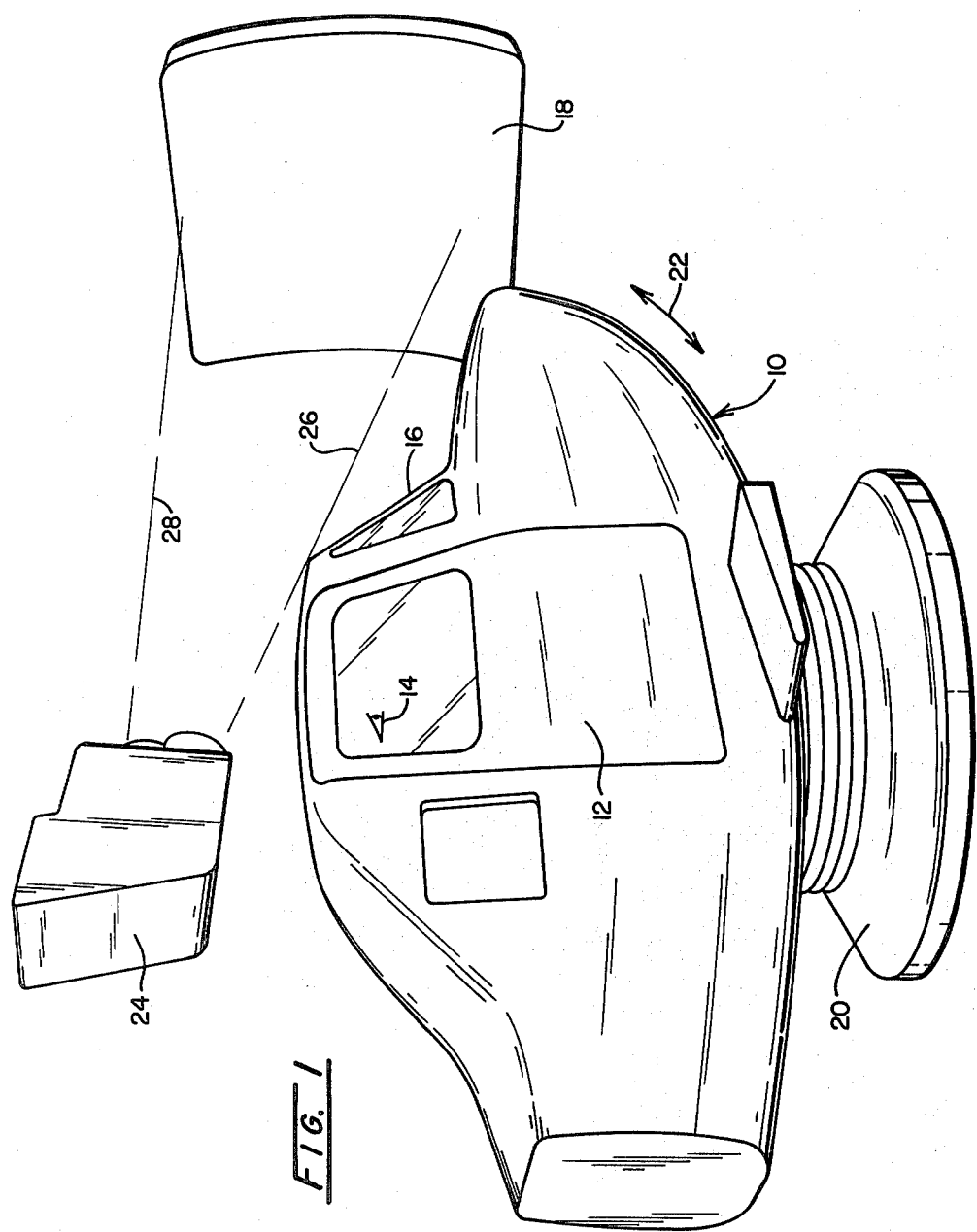

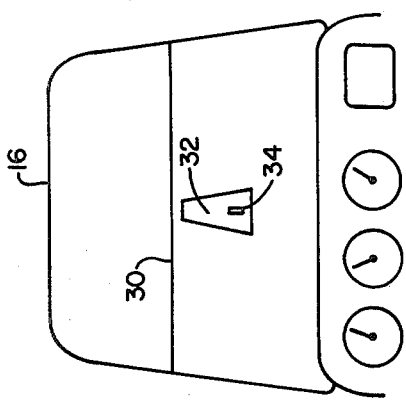
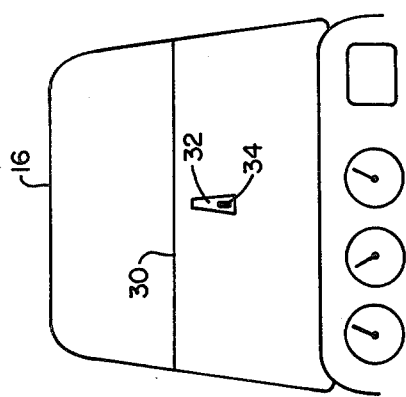
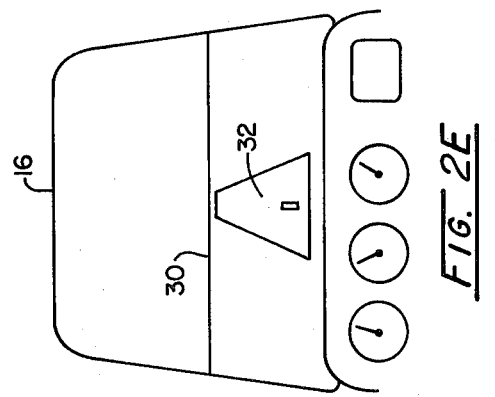
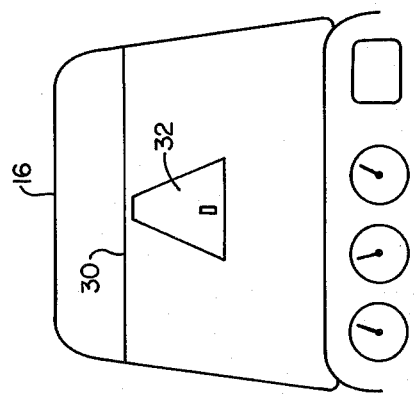
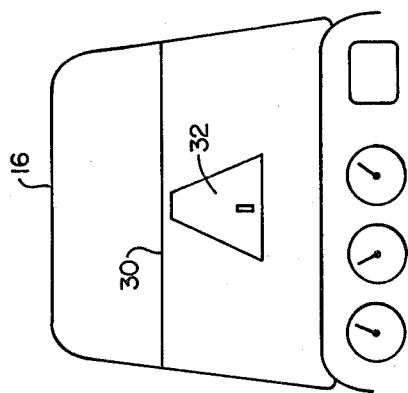

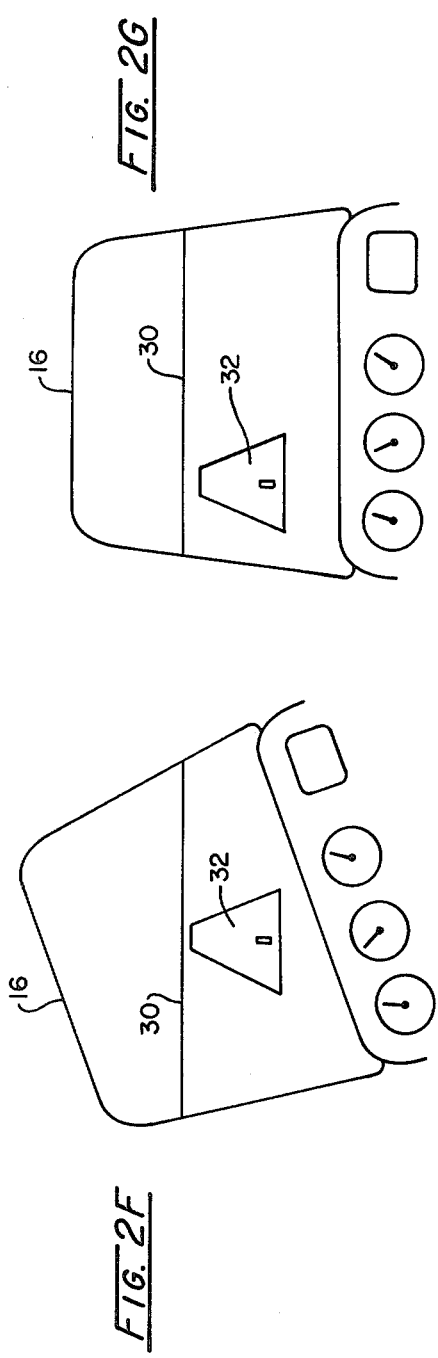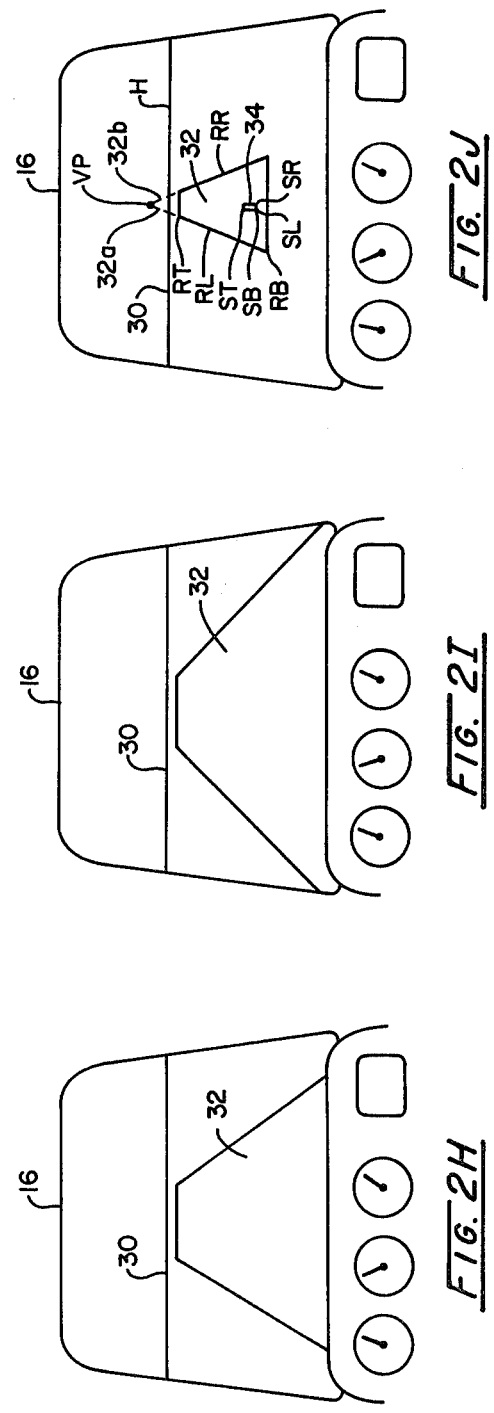

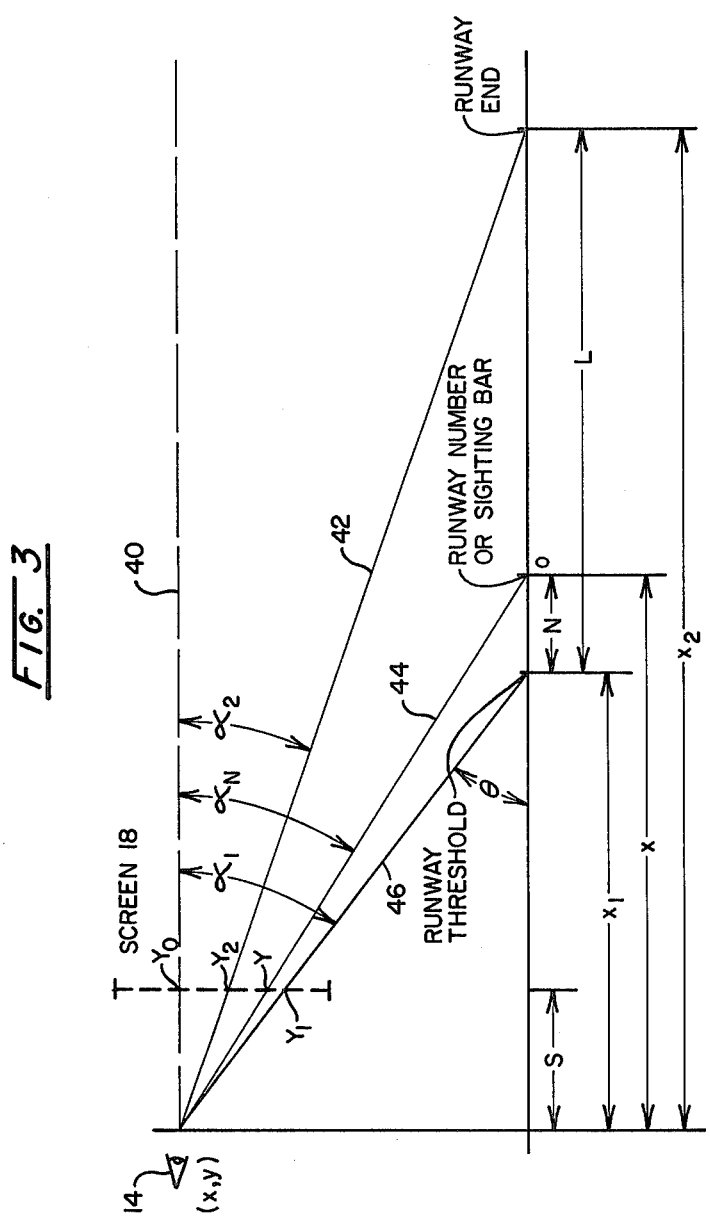

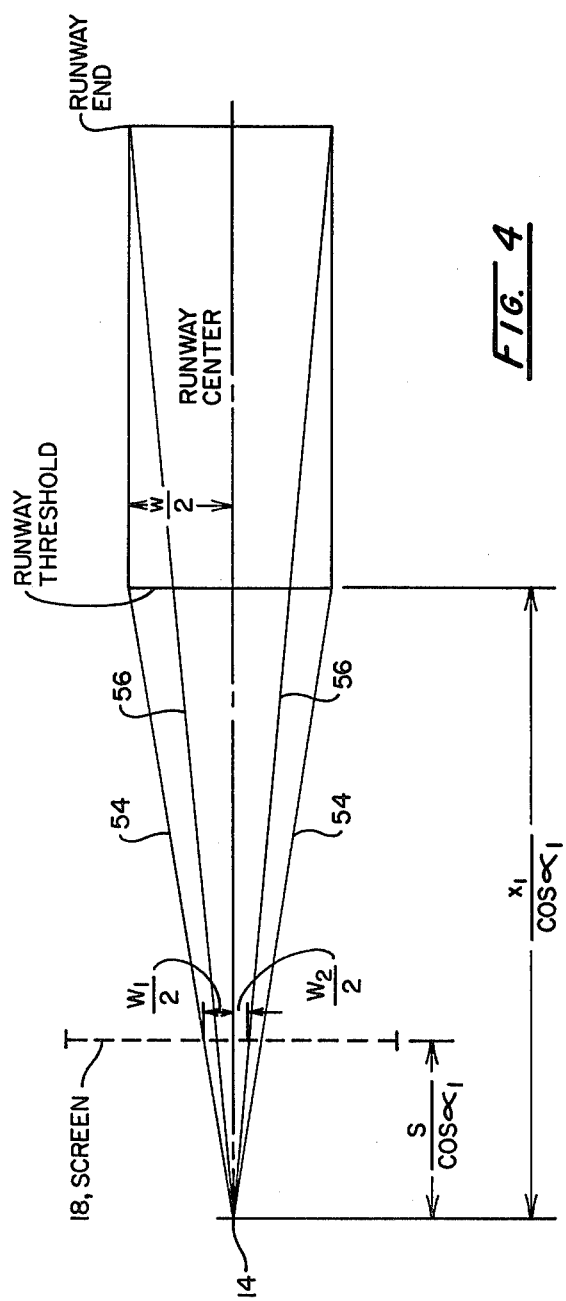

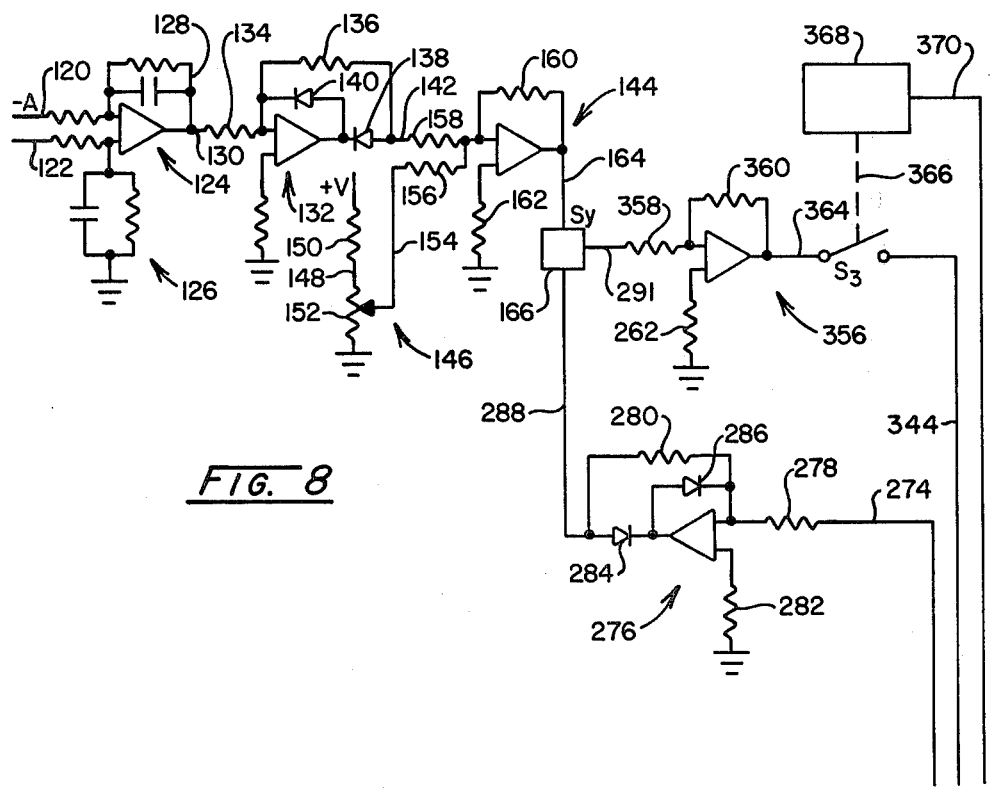

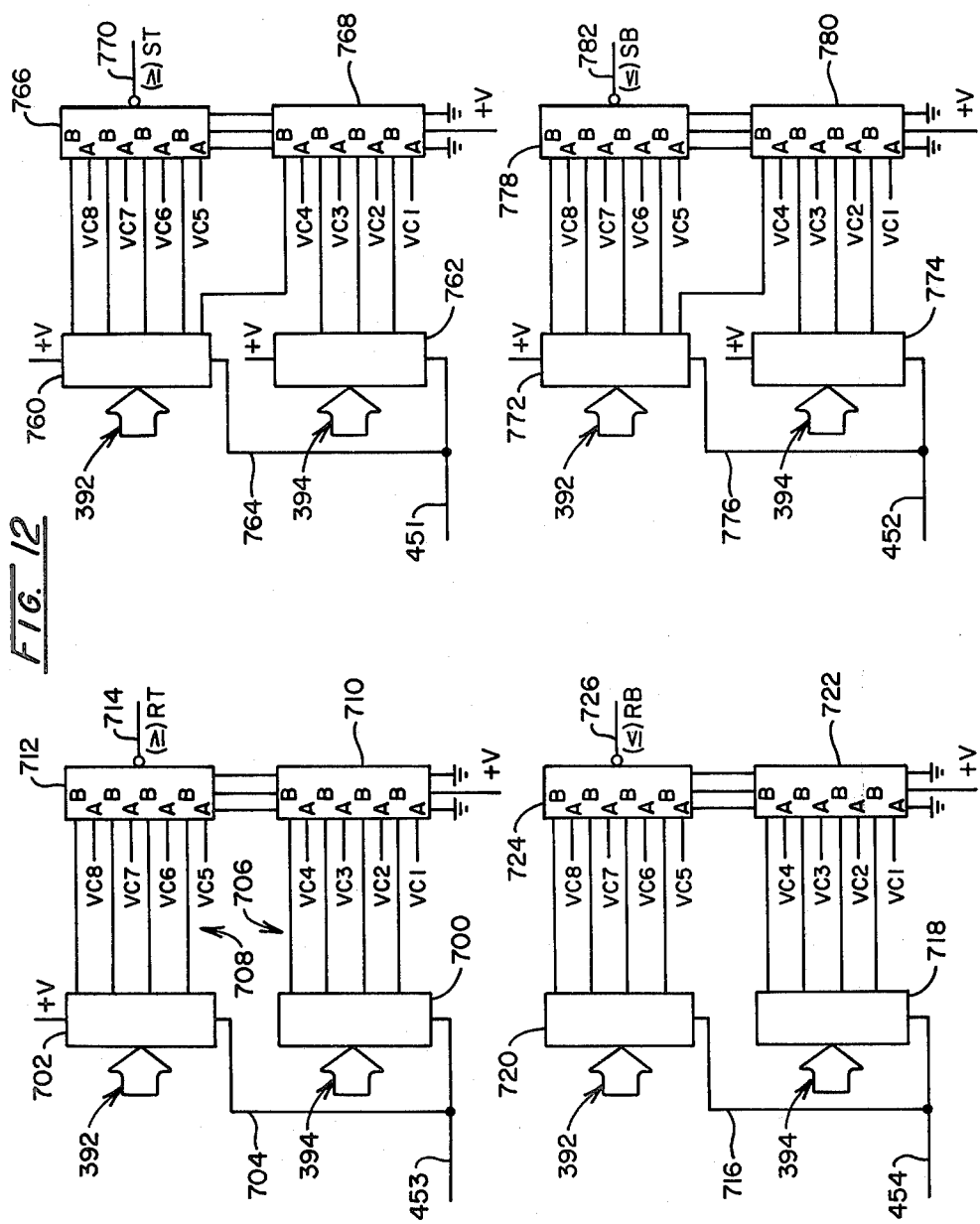

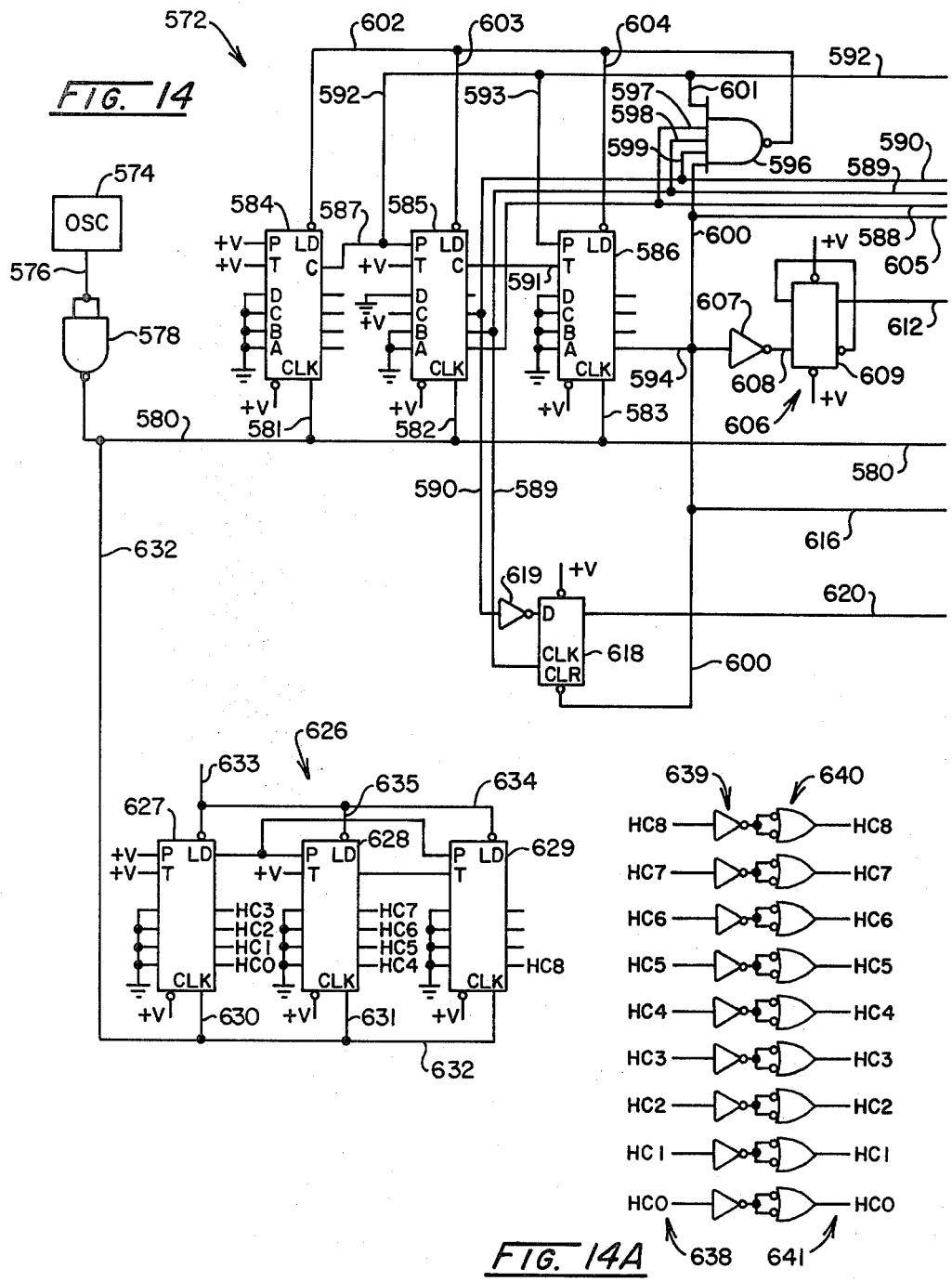

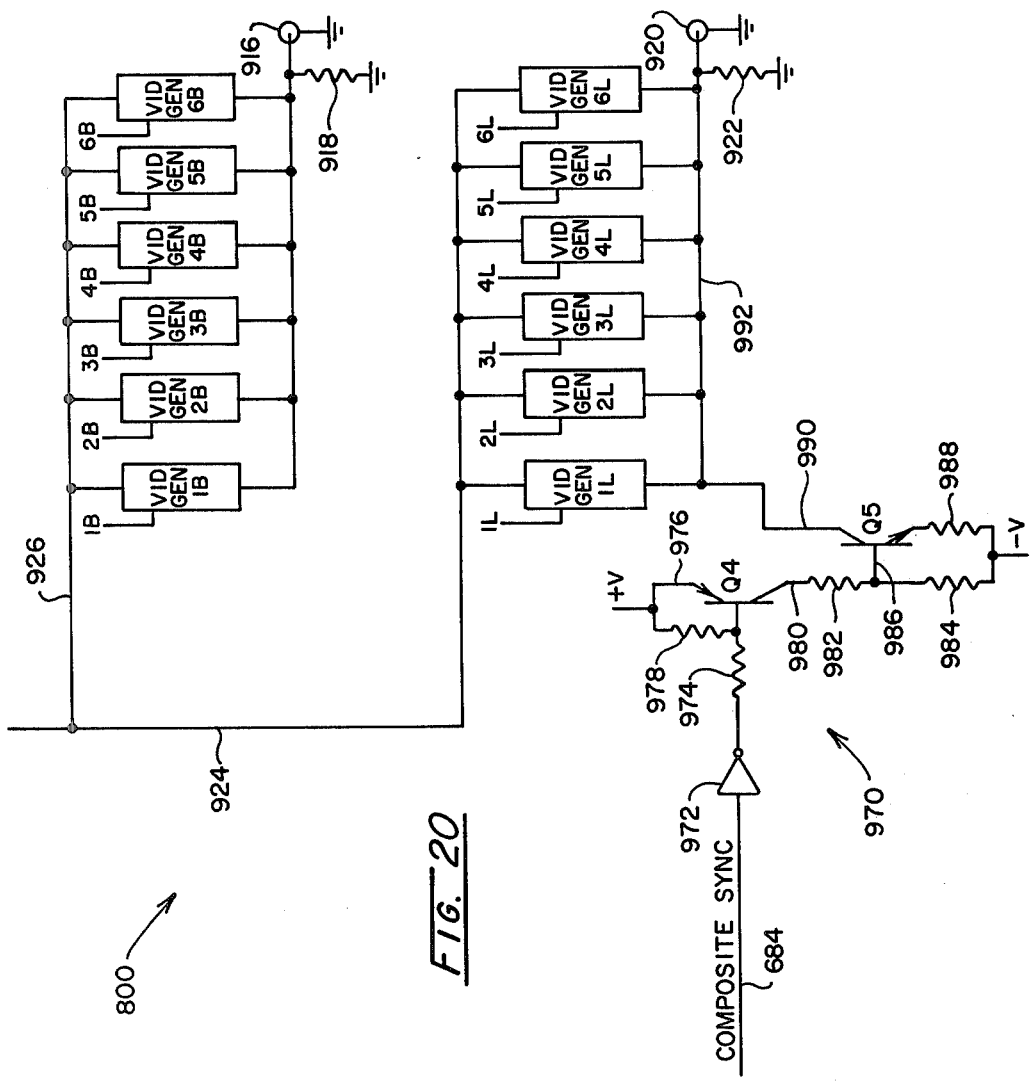

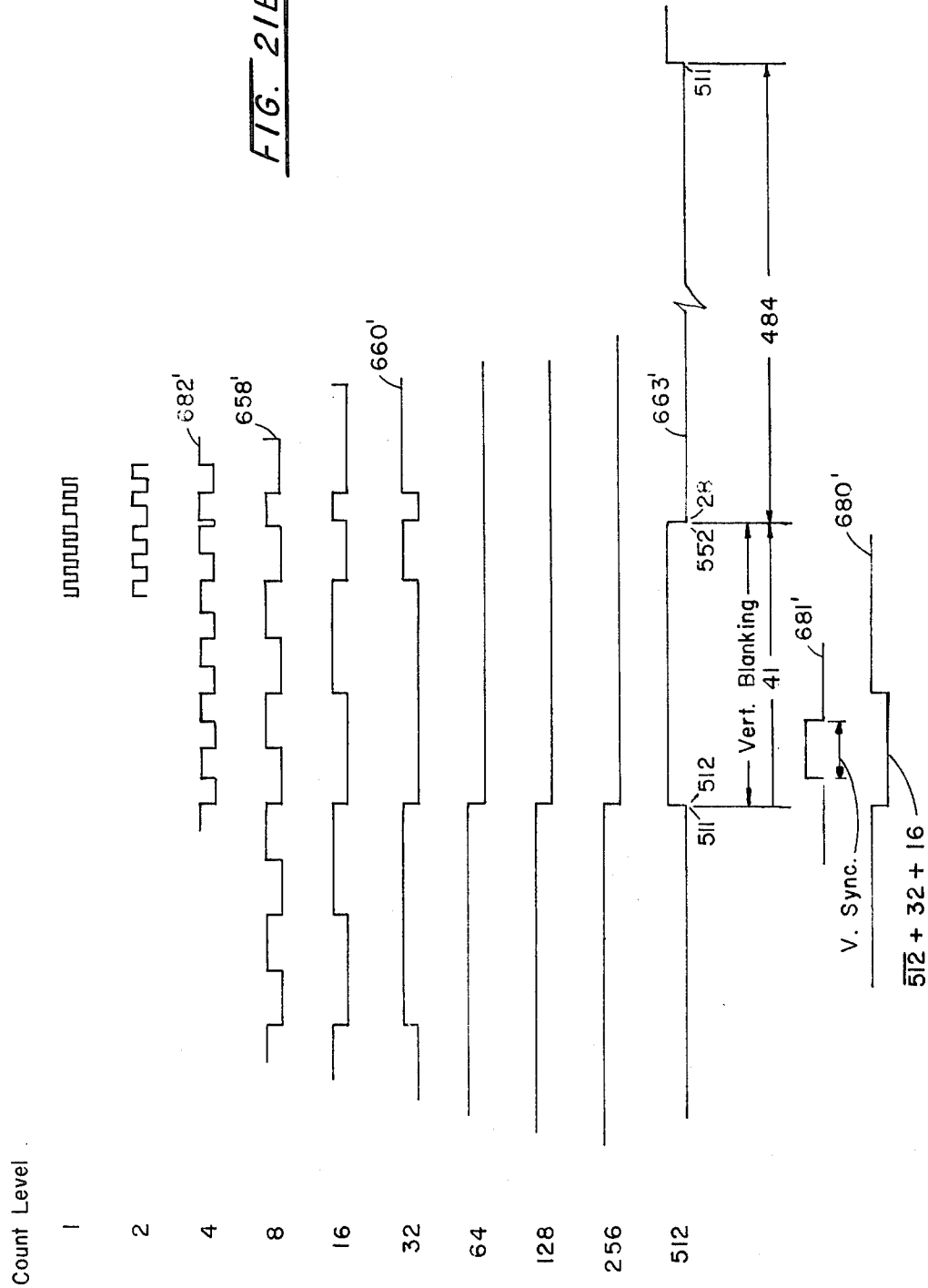

FLIGHT SIMULATOR WITH SPACED VISUALS

The invention described herein was made in the performance of work under NASA Contract Number NAS-2-8954 and is subject to the provisions of Section 305 of The National Aeronautics and Space Act of 1958 (72 Stat. 434; 42 USC 2457).

BACKGROUND

Ground-based flight trainers or flight simulators have been in use in the aviation field for many years and their value has been amply proven. Generally, there are considered to be two generic forms of simulations, engineering simulation and training simulation. Engineering simulation in one which attempts to recreate a condition as faithfully as possible to achieve an evaluation of engineering factors. Consequently, such simulation attempts to achieve as high a fidelity of reproduction of the condition as possible. Training simulation, on the other hand, is designed to facilitate initial skill acquisition as well as proficiency maintenance and the degree of fidelity required for such simulation has been the subject of scientific inquiry. Concerning this inquiry, there has existed for some time a belief that the greater the fidelity of a simulation for training purposes, the greater the training effectiveness. Thus, for the most part, currently utilized trainers are highly elaborate and complex and, consequently, are available only at relatively high cost. Requisite expenditures for their utilization, therefore, usually are justified only by larger user entities, i.e. commercial aviation, government or larger corporate aircraft owners. For such organizations, these higher costs become justified where a sufficient quanta of pilot performance learned in the trainer transfers to adequate performance in a corresponding aircraft. This has been found to be the case with respect to commercial aviation, somewhat elaborate simulators having been found to lower the cost of pilot training in transitioning from one aircraft model to another or in maintaining skills. For example, where pilots have been required to spend an average of approximately twenty hours of in-flight training to transition to a new aircraft, with the advent of simulation, this requirement has been gradually reduced by a factor of five to ten for a variety of aircraft types. While the pilots are required to spend approximately the same number of hours in training, the total time required is actually reduced by reasons of the greater availability of simulators and the elimination of much of the preparation time. The safety factors associated with the elimination of much of the in-flight training time, the release of aircraft for revenue flights and decreased cost of operating a simulator rather than an aircraft for training have provided adequate cost justification for the larger users operating in conjunction with experienced pilots. See in this regard:
1. "Visual Elements in Flight Simulation", Brown, Aviation Space and Environmental Medicine, Vol. 47, September 1976, pp. 913–924.

While the cost of simulator training is justified in case of pilot qualification for large, complex aircraft, it has been considered prohibitive for applications in general aviation. Given such justification, however, ground-based training facilities would play an important role in primary training within the general aviation field as well as commercial fields. Such simulator training would be of particular advantage in the more difficult phases of flight. In the latter regard, learning to land an airplane represents one of the most difficult phases of training. See in this regard:
2. Creelman, J. A., Evaluation of Approach Training Procedures. Pensacola, Fla.: U.S. Naval School of Aviation Medicine, Report Number 2, 1955.

The landing phase of aircraft flight, also, is one of the most dangerous, and after pilot training, remains so even for experienced pilots. See:
3. Young, L. L., Jensen, R. S., and Treichel, C. W., Use of a Visual Landing System in Primary Flight Training. Proceedings of the 17th Annular Meeting of the Human Factor Society, Santa Monica, Calif.: Human Factors Society, 1973.

It has been opined that poor definition of important visual cues or the imprecision of the information gained from such cues contributes substantially to the difficulties of learning approach and landing of an airplane. Generally, pilot proficiency in landing maneuvers depends upon perceptual judgments that must be acquired primarily by repetitive practice that is both time consuming and often frustrating, the novice pilot executing repeated landing and takeoff maneuvers being required to expend about six minutes in circling and flying the downwind leg and, of course, such maneuvers also affect control tower operations. By providing a trainer with a final (straight-in) approach and land capability, the novice pilot may execute this most important maneuver with considerable rapidity. Further, the instructor may stop the maneuver at any point and provide explanation of erroneous procedures and the like. For a more detailed discussion, see the following publications:
4. Hasbrook, A. H., The Approach and Landing: Cues and Clues to a Safe Touchdown, Business and Commercial Aviation, Nov. 1975, pp. 39–43.
5. Department of Civil Aviation. Flight Instructor's Manual: Melbourne, Australia: Lintern, Publication Number 45, 1967.

Computer generated visual information systems have been developed for a broad range of aircraft training simulation applications. While the majority of such systems have been generated for utilization in the more elaborate installations, for example, use in evolving the visual cues of varied locations with night terrain, developments also have been witnessed in the generation of such visual cue systems for less elaborate installations. One such system is described in British patent specification 1446334 wherein a video readout of specific visual terrain cues is provided at the windscreen of a fixed-base training cockpit. The system serves to associate the controls of the cockpit, an electonic logic assembly or computer and the video readout to achieve a visual training simulation. The electromics associated with such computerized systems are called upon to generate by analogue technique a view of simulated terrain with a six degree of freedom capability, for example, signals representative of latitude and longitude, altitude, heading and the attitudes of pitch and roll. The electronic components required to accommodate these six variables are somewhat extensive, the computer components of such prior systems being required to perform cosine-related analogue transformation logic, a task which is quite complex electronically and involves concomitant cost considerations. Additionally, cues other than visual are not available with the system, i.e. motion generated cues associated with, for example, pitch and roll.

Another aspect of visual cue effectiveness concerns the requisite development of visual perspective or depth perception. This perception is developed both by virtue of the parallax of the human visual structure and by the projected shape of the runway. While the latter is the major factor developing this perspective, in trainers, should that shape appear at the training cockpit windscreen, then a perspective conflict arises between the shape perspective and binocular parallax effect. To accommodate for this, the elaborate training installation usually employ mirror system to project the virtual image to infinity. While this optical correction is effective, it remains costly, prohibiting its use in the general aviation trainers now contemplated.

Some investigators have considered that the interactions between the visual system, the proprioceptive system and the vestibular system are of importance. In this regard, it has been considered by some that visual motion in the absence of corresponding physical motion does not evoke a satisfactory cue for training purposes. Physical motion has for some time been incorporated in training devices including those suited for general aviation but not incorporating visual cues and utilized for more experienced pilots in developing instrument navigational capabilities. The motion cue components developed for the more elaborate aircraft trainers operate on the basis that the accelerations of the initiation of a motion pattern are duplicated, but decelerated below the threshold for motion detection before the mechanical limits of the simulator are reached. This technique of "washing out" the motion has been considered a successful motion cue. Since humans sense acceleration but not constant velocity, a reasonable solution to the motion simulation problem is achieved within practical cost limitations. For a more detailed discourse concerning the above, reference is made to publication 1 above.

From the foregoing, it may be observed that a need exists for a flight simulator trainer system which can provide both visual and motion cues and which will serve as an effective trainer for the final approach and flare out to landing procedures for aircraft. Further, such a device is needed which is economical to the extent that it can be utilized for training pilots in the general aviation field where severe training cost constraints are present.

SUMMARY

The present invention is addressed to an apparatus method and system for aircraft flight simulation which, operating in conjunction with presently available moveable-base type aircraft simulators, develops highly acceptable visual flight training cues at cost levels commensurate with the needs of the general aviation industry. These necessary lower cost levels are realized in consequence of a series of unique approaches to the visual simulation of a runway during approach and landing maneuvers.

As one feature of the invention, a general aviation trainer including a cockpit mounted for movement in roll, pitch and a crab form of yaw upon a stationary base is positioned such that the eye location of the trainee therein looks through a front window-like opening to a stationary display surface. This generally vertically oriented display surface or screen carries a video raster generated runway image which alters in shape or geometric perspective in correspondance with the simulated altitude and simulated distance of the trainer from the runway. The display surface is spaced from the trainer a distance, for example, of about 8 feet, that spacing being selected such that the trainee perceives no conflict between depth perception due to shape versus binocular parallax depth perception, and the area extent of the screen is such that the image is perceived from the eye position throughout most lines of sight encompased by the periphery of the front window of the trainer. With this arrangement, the attitude aspects of roll, pich and crab orientations are asserted at the trainer and the remaining visual geometry is carried out by video related electronics. As a consequence, only three degrees of freedom of an ordinarily necessary six degrees of freedom are required to develop the image at the display surface.

As another feature and object of the invention, geometric relationships with respect to runway image shape required for visual simulation have been evolved which uniquely achieve image development without the necessity of computing with trigonometric functions, only simple arithmetic computations being required of supporting electronic logic circuitry. This latter aspect further contributes significantly to a reduction in system costs.

Another object and feature of the invention, resides in an electronic feature wherein the longitudinal edge of the runway image are advantageously generated through the utilization of an accumulative line generator operating in conjunction with a predetermined vanishing point. In this regard, the image generated at the display surface is one having a horizontal horizon which remains fixed and above which is established a vanishing point, being that point at assumed infinity whereat all longitudinally disposed lines emanating from the eye position converge. By computing the altitude-and distant-responsive slope values for the two edges of the runway extending from this vanishing point, the runway image is generated utilizing significantly simplified electronics. Operating in conjunction with the line generator function are networks which, again using straightforward arithmetic computations, serve to define the runway threshold and end positions of the image.

Another object of the invention is to provide visual display apparatus for synergic use with a flight simulator system, such system being a variety including a base supported aircraft trainer having a cockpit with a front window-like opening for providing lines of sight from an eye location within the cockpit. The trainer incorporates flight controls which are moved to cause the cockpit to move upon the base in roll, pitch and rotational attitudes. A stationary display surface viewable from the eye location through the window opening is spaced from the eye location a distance determined to avoid conflict between shape perspective and that occasioned by binocular parallax. A video image is carried by the display surface which incorporates a fixed, horizontal horizon below which extends the image of a runway of designated length between the threshold and ends thereof and having a width defined between the lengthwise edges thereof. The trainer system includes an arrangement for generating simulated altitude signals, y, substantially representative of the height of the eye location above the image runway, as well as means for generating velocity signals representing the instantaneous simulated velocity of the trainer with respect to ground at the level of the runway. The visual display apparatus includes a first circuit for developing slope signals corresponding with the slopes of the images of the runway lengthwise edges as a quotient of a constant runway width value divided by a value representative of the simulated instantaneous altitude, y. A timing circuit is utilized for generating, in digital fashion, video raster controls including horizontal scan information and control signals developed through a predetermined digital sequence and vertical information and control signals also developed through a predetermined digital sequence. The apparatus further includes a circuit for generating a signal representing the predetermined vertical location of the noted vanishing point upon the raster. Preferably, this point is located (for a projection screen of 4 feet height) about two inches above horizon and at the middle of the raster image. The line generator circuit responds to the timing circuit horizontal scan information signals and the slope signals for accumulatively summing the slope signals with signals representing the raster horizontal location of a next preceding image increment of a given runway lengthwise edge. This accumulation of runway edge data commences with the correspondence of the vertically definitive vanishing point signal and the vertical information generated by the vertical components of the timing circuit. The simulated distance of the trainer from the runway threshold or other predetermined position is achieved by integrating velocity signals and the resultant distance signal, x, is utilized by a runway threshold position determining circuit which develops a runway threshold signal corresponding with the image location of the runway threshold substantially as a quotient of the product of the altitude signal, y, and a signal corresponding with the predetermined distance between eye position and the display screen divided by the distance signal, x. Thus, a relatively simple arithmetic operation is required to achieve runway threshold data. The apparatus additionally includes a runway end circuit which develop a runway end signal corresponding with the image location of the visualized far end of the runway substantially as a quotient of the product of the altitude signal, y, and a signal corresponding with the predetermined distance between the eye position and display surface divided by a signal representing the sum of the distance signal, x, and a signal corresponding with the predesignated length selected for the runway. A video processing circuit is provided which is responsive to the line generators' output signals, the runway threshold signals and runway end signals, as well as the timing circuit horizontal and vertical control signals for deriving video outputs which are asserted at a video imaging arrangement, for example, a projection type television receiver.

As a further object of the invention, a line generator is provided which includes a comparator circuit having one input coupled to receive timing circuit horizontal scan information as well as a second input for receiving runway edge image increment signals and which has an output for providing signals representing the digital correspondence between these two inputs. The generator circuit further incorporates an adder network which has a first input for receiving the above-described slope signals as well as a second input for receiving slope signals for developing a summation of these signals at its output. A data selector network is provided having a first input for receiving the adder network output sum signals as well as a second input for receiving a signal representing the horizontal position predetermined for the vanishing point at the raster. This selector network is actuable in response to a signal representing a horizontal beam scan above the vanishing point to present a signal reresenting the horizontal position of the vanishing point at its output and further actuable to present the summed signals of the adders at its output the occasion of that horizontal scan reaching the vanishing point and positions below that point. A memory arrangement is provided having an input for receiving data selected signals and which is actuable to transfer the received signals to the earlier-described comparator circuit second input and simultaneously to the adder network second input. Thus, an accumulator function developing a sloping runway image signal is provided. Horizontal scan information is utilized to actuate the line generator to carry out the noted adding function during a horizontal blanking pulse.

As another feature an object of the invention, the timing circuit utilized with the apparatus of the invention is one incorporating synchronous counters for evolving horizontal count information as well as vertical count information. A central clock is utilized for driving the horizontal counters and this clock, combined with a form of carry look ahead enablement, advantageously develops an accurate timewise synchronization of the entire timing system.

To achieve enhanced reality within the system, a network is utilized in conjunction with a video processing function to achieve an image output having an intensity which varies from a lowermost value at the top of the raster image toward the bottom of that image in consonance with the same visual cues observed in real life.

Other objects of the invention will, in part, be obvious and will, in part, appear hereinafter.

The invention, accordingly, comprises the apparatus, method and system possessing the construction, combination of elements, arrangement of parts and steps which are examplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a perspective view of the system of the invention showing the location of a general aviation trainer, display surface and projective television receiver, FIGS. 2A–2I show schematic views looking through the front window opening of a trainer toward an image displayed on a surface as shown in FIG. 1, while FIG. 2J shows a similar scene with image-related data and positions shown in alphabetical fashion;

FIG. 3 is a schematic representation of one geometric and computational aspect of the invention;

FIG. 4 is a schematic diagram of another geometric and computational aspect of the invention;

FIG. 7 is a diagram showing the mutually associated drawing positions for reading FIGS. 8, 9 and 10;

FIG. 8 is a portion of a schematic diagram showing a circuit according to the invention;

FIG. 12 is a schematic diagram showing components of a circuit utilized with the invention;

FIG. 14 is a schematic diagram showing components of a circuit utilized with the invention;

FIG. 14A is a partial schematic circuit diagram intended to be read in conjuction with one network component of the circuit of FIG. 14;

FIG. 20 is a schematic circuit diagram of another portion of a video processor circuit utilized in connection with the instant invention; and FIGS. 21A and 21B are timing diagrams respectively, related to the horizontal counting aspects and vertical counting aspects of the timing function of the circuit of the invention.

DETAILED DESCRIPTION

Figure 5:
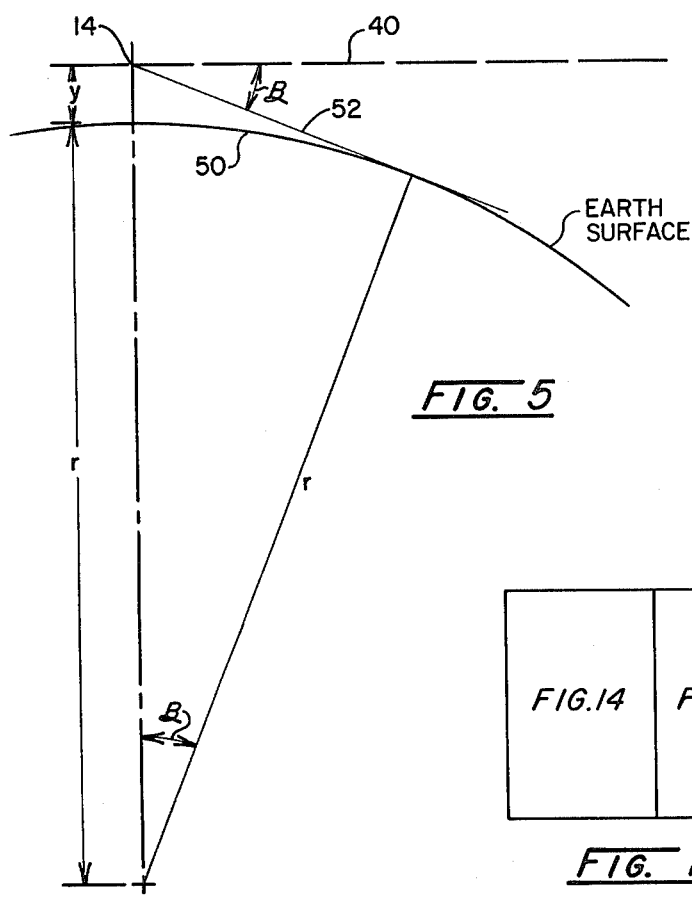
FIG. 5 is a schematic diagram of still another geometric aspect of the invention.
Figure 13:
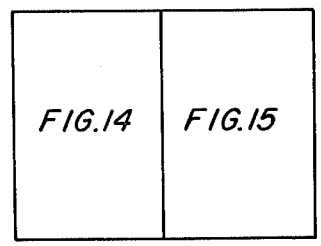
FIG. 13 is a diagram showing the proper drawing orientations to be used in reading FIGS. 14 and 15.
Figure 17:
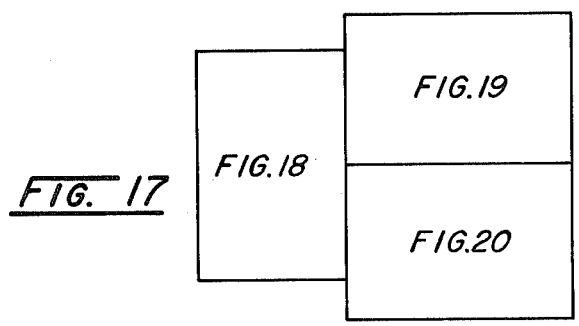
FIG. 17 is a diagram showing the proper drawing orientations to be used in reading FIGS. 18–20.

The aircraft simulation system of the present invention is one wherein a visual runway image is generated at a fixed screen spaced a predetermined distance from a conventional general aviation trainer having a supportive base moveable in roll, pitch and crab-type rotational attitudes. Looking to FIG. 1, such an arrangement of components is portrayed schematically. The trainer cockpit component 10 may be one typically used in general aviation instrument training, for example model GAT-1 marketed by the Singer Company, Link Division, Binghamton, New York. Trainer 10 incudes an access door 12 through which the trainee may enter and sit within a cockpit having controls simulating those within an aircraft utilized in general aviation. The trainee sits within the cockpit in a manner wherein eye level is about at the location shown at 14. Thus located, the trainee looks through a simulated windscreen 16 in the direction of a relatively large projection screen 18. The cockpit of trainer 10 rest upon a moveable base 20 which, for the instant application, provides motion in pitch roll and crabbing attitudes in response to the control asserted by the trainee within the cockpit. The pitch component of this rotative motion about the pivot axis of the trainer is represented by the curved arrow 22. Above the trainer 10 there is mounted a projection-type television receiver 24. Video image projector 24 may be of conventional variety and is mounted in isolation from trainer 10 such that the motion in pitch roll and crab rotational attitudes witnessed from within trainer 10 does not affect the positioning of the receiver 24.

The arrangement shown in FIG. 1 is one intended for the training of final approach, flare and landing maneuvers and the scene witnessed from eye level 14 may be considered to commence from a selected position behind the approach end of a projected runway and aligned with the centerline thereof. FIG. 2A represents such a scene at screen 18 as viewed through windscreen 16. Note, that the horizon appears as a stationary line 30 above which bluish sky is provided. Below horizon line 30, four lines representing the left, right, top and bottom edges of a runway 32 are provided, the lengthwise edges of the runway having a very slight trapezoidal slant to achieve proper visual perspective for altitude and distance to the runway. The runway numbers are represented in the image as a sighting bar 34. In FIG. 2B, the trainer control indicates that the simulated aircraft is at a position closer to the threshold of the runway. Note that the lengthwise edges of the runway 32 define a more pronounced trapezoidal slope and that the image of the runway widens at the threshold region. FIG. 2C shows the image of runway 32 at a closer location and for the pitch attitude of the trainer to be proper for a land procedure. Should the pitch attitude of the trainer be improper, for example a low nose orientation, the view witnessed through windscreen 16 would be that shown in FIG. 2D. The horizon lines in FIGS. 2C and 2D are in mutual alignment to demonstrate that the physical movement of trainer 10 has caused this change in view. As noted above, the horizon itself at screen 18 remains stationary throughout the simulated landing. Similarly, FIG. 2E, also having horizon 30 aligned with the corresponding horizons of FIGS. 2C and 2D, shows the view witnessed by the trainee for a corresponding nose high pitch attitude, the physical movement of trainer 10 causing the change in view through windscreen 16. Should the pilot cause the trainer 10 to execute a roll maneuver the scene observed through wind screen 16 will appear as shown in FIG. 2F, while a crab orientation of the trainer will derive the scene shown in FIG. 2G. In FIGS. 2D through 2G, the angular coordinates corresponding with roll pitch and yaw are accommodated for by the movement of trainer 10 and windscreen 16 as opposed to utilizing complex circuitry to achieve such visual display.

FIG. 2H shows the image witnessed through windscreen 16 as the trainer reaches the simulated threshold, while FIG. 2I shows the image following simulated touchdown.

Returning to FIG. 1, it may be observed that a predetermined distance is provided between eye position 14 and screen 18. This distance is selected as about 8 feet, a distance beyond which the majority of people are unable to perceive depth by virtue of binocular parallax. Inasmuch as depth perception in a training mode must be achieved from an observation of the geometric changes of visual cues, i.e. the runway shape changes described above in connection with the sequence of FIG. 2 views, by so positioning screen 18 with respect to eye position 14, no conflict between binocular parallax and shape-derived perception will arise.

Considering the geometry involved in generating an image of runway 32, it may be observed that the calculations of runway edge orientation and position depend only upon the presumed distance of trainer 10 to the runway 32 and its presumed altitude. The transformation involved is one providing for a projection of a horizontal map of runway 32 upon vertical screen 18 and, in practical effect, window 16 through which eye 14 is observing the image.

Looking to FIG. 3, the geometric considerations in developing the runway 32 image with respect to the distance from eye position 14 to any point thereon are considered. In the figure, eye position 14 is arbitrarily located at a point (x, y) with respect to the origin of coordinates, o, positioned along a horizontal x axis at the location of the runway number or sighting bar. The computations to follow assume the earth is flat and a horizontal line 40, extending from eye position 14, represents a line parallel to the surface of the earth. The runway in the figure is represented as having a length, L, and the threshold thereof is shown positioned horizontally a distance, $x_1$, from eye position 14, while the runway end is shown positioned a distance, $x_2$, from eye position 14. The runway number or sighting bar is represented as being a distance, x, along the horizontal axis from eye position 14 and a distance, N, from the runway threshold. Eye position is considered to be at an altitude, y, and from that position, sight rays 42, 44 and 46 extend, respectively, to the runway end, runway number and runway threshold. Screen 18 represents a plane in image space through which horizontal line 40 as well as rays 42, 44 and 46 are considered to penetrate. These points of penetration are represented at Y, $Y_0$, $Y_1$ and $Y_2$. Note, that the screen 18 is represented as being positioned a distance, S, from eye position 14. For scaling purposes, reasonable values may be assigned to the dimensions of the runway. For example, its length, L, may be designated as 5,000 feet, its width, W, may be assigned a value of 150 feet, the distance, N, to the numbers or sighting bar may be designated as 100 feet, and the earlier-discussed distance to screen 18, S, is assigned a length of 8 feet.

Looking to the trigometric relationships for developing the locations of the above described screen 18 intercept point, the following relationships may be observed to apply:

$$\alpha_1 = \tan^{-1} \frac{y}{x_1} \quad (1)$$

$$\alpha_N = \tan^{-1} \frac{y}{x} = \tan^{-1} \frac{y}{x_1 + N} \quad (2)$$

$$\alpha_2 = \tan^{-1} \frac{y}{x_2} = \tan^{-1} \frac{y}{x_1 + L} \quad (3)$$

Now, utilizing the above equations, absolute values for vertical distances upon screen 18 are established by the following relationships:

$$|Y_0 - Y_1| = S \tan \alpha_1 = S \frac{y}{x_1} \quad (4)$$

$$|Y_0 - Y| = S \tan \alpha_N = S \frac{y}{x_1 + N} \quad (5)$$

$$|Y_0 - Y_2| = S \tan \alpha_2 = S \frac{y}{x_1 + L} \quad (6)$$

Note from the above, that the trigonometric functions have dropped out of the expressions for each of the absolute vertical values at screen 18. The expressions above, further may be converted to terms of simulated aircraft position from the runway numbers or sighting bar, o, as follows:

$$|Y_0 - Y_1| = S \frac{y}{x - N} \quad (7)$$

$$|Y_0 - Y| = S \frac{y}{x} \quad (8)$$

$$|Y_0 - Y_2| = S \frac{y}{x + L - N} \quad (9)$$

The above expressions are exemplary, and show that the threshold position is represented by equation (7), the end of the runway is represented by equation (9), and the threshold end of the runway number or sighting bar is represented by equation (8). Other, similar expressions representing other runway features will be apparent to those skilled in the art. All of the equations necessary are devoid of trigonometric functions and readily may be developed by applying the theory of similar triangles. A highly desired simplicity results, for example, equation (8), relating the projected touchdown point (o) with the projection of that point on screen 18 (Y), may be stated as the distance from eye position 14 to the screen multiplied by the ratio of the altitude of the aircraft to the horizontal distance to the sighting bar. Thus, any given projection point along the runway can be calculated in the absence of an explicit trigonometric expression.

Turning to FIG. 4, a top, diagrammatic view shows rays 54 and 56 extending from eye position 14 down a sloping plain to the edges of the runway respectively at the runway threshold and end. Thus, the distances along these lines of sight represent hypotenuses of triangles. The corresponding runway threshold distance to screen 18 is represented by expression, $s/\cos \alpha_1$. Similarly, the distance to the edge of the runway at the threshold may be represented by the expression, $x_1/\cos \alpha_1$.

In accordance with the instant invention, the development of expressions for the apparent width of the runway at its threshold at screen 18, $W_1$, as well as the apparent width of the runway end at screen 18, $W_2$, can be developed without resort to cosine functions. Considering the similar triangles involved in FIG. 4, the ratio of the width of the runway at the threshold to the distance to eye position 14 may be expressed as follows:

$$\frac{\frac{W}{2}}{\frac{x_1}{\cos \alpha_1}} = \frac{\frac{W_1}{2}}{\frac{S}{\cos \alpha_1}} \quad (10)$$

The corresponding ratio for the distance along the center line sloping projection lines to the runway threshold as represented at screen 18 may be expressed as follows:

$$\frac{\frac{W_1}{2}}{\frac{S}{\cos \alpha_1}} \quad (11)$$

Dividing equation 11 by equation 10 provides the following expression:

$$\frac{W_1}{w} = \frac{S}{x_1} \text{ or } \frac{W_1}{2} = \frac{w}{2} \cdot \frac{S}{x_1} \quad (12)$$

Again, utilizing similar triangular relationships, the apparent half-width of the end of the runway, $W_2/2$, at screen 18 may be expressed as follows:

$$\frac{W_2}{2} = \frac{w}{2} \cdot \frac{S}{x + L - N} \quad (13)$$

With the above approach to developing runway width and vertical position thereof at screen 18, no trigonometric functions, particularly cosine functions, are involved in the expressions. The equations above show that the runway width, distance from the sighting point 14 to a desired projection point, distance from the sighting point 14 to the screen 18 and apparent altitude, y, represent all the computational factors involved. Of these factors, the only variables utilized are apparent height of the aircraft and distance to a desired projection point at the runway. It further may be observed that the geometric relationships which were considered in developing the expressions above are all taken with respect to horizontal line 40 as considered in connection with FIG. 3 and with the runway center line with respect to the expressions develped in connection with FIG. 4. For either case, only arithmatic ratios are involved, an arrangement which will be seen to greatly simplify the electronic implementation of a projected runway image.

The degree of error involved in developing the instant system under an assumption of a flat earth may be evaluated by resort to the diagrammatic arrangement of FIG. 5. Referring to that figure, the horizontal line 40 is reproduced and the sight position 14 is shown positioned at an altitude, y, above an earth surface represented by the curve 50. This surface is shown having a radius, r, and a tangent to the earth's surface from eye position 14 is shown at 52. This tangent is shown to form an angle $\beta$ with horizontal line 40, which, by virtue of similar triangles, is repeated as shown at the earth's center. With this arrangement, the cosine of the angle $\beta$ may be represented as follows:

$$\cos \beta = \frac{r}{r + y} \tag{14}$$

For small angles, expression (15) may be written as follows:

$$\cos \beta \approx 1 - \frac{\beta^2}{2} \tag{15}$$

Again, for the small angles involved, a reasonable approximation for the value of the angle $\beta$ is as follows:

$$\beta = \sqrt{\frac{2y}{r}} = 3.08 \times 10^{-4} \sqrt{y} \tag{16}$$

Assuming a reasonable altitude of 1000 feet, the angle $\beta$ becomes 0.00973 radians. This ultimately develops an error of about 2 inches for airport pattern altitudes as high as 4000 feet, which may be considered negligible for the instant application wherein the screen 18 vertical dimension as well as the overall image projected thereto is about 4 feet and the widthwise dimension is about 6 feet. The above analysis will be seen to support a later described positioning of a "vanishing point" within a generated image at a screen 18 level slightly above the line defining a horizon. This vanishing point is the location of convergence at infinity of lines of sight from the pilot eye position.

Utilizing the above-described geometric logic wherein trigonometric functions are avoided, the instant invention evolves the trapezoidal variation of the runway image described in connection with FIG. 2's utilizing only the air speed and altitude signals of the aviation trainer in conjunction with constant values representing runway width and the like. Of particular importance, this information is utilized in conjunction with a slope responsive line generator which serves to develop the image of the longitudinally disposed edges of the runway. Inasmuch as the visual simulation is one wherein the trainer is considered to be continuously aligned with the centerline of the runway, the slopes of both of these runway edges are equal but of opposite sign. The development of the value for this slope also is one wherein trigonometric functions are avoided. Returning momentarily to FIG. 3, it may be observed that the slope for either runway edge simply represents a division of expression (13) by expression (9). When thus divided, the result is:

$$\frac{\frac{w}{2}}{y} \tag{17}$$

a division readily carried out electronically.

Figure 6:
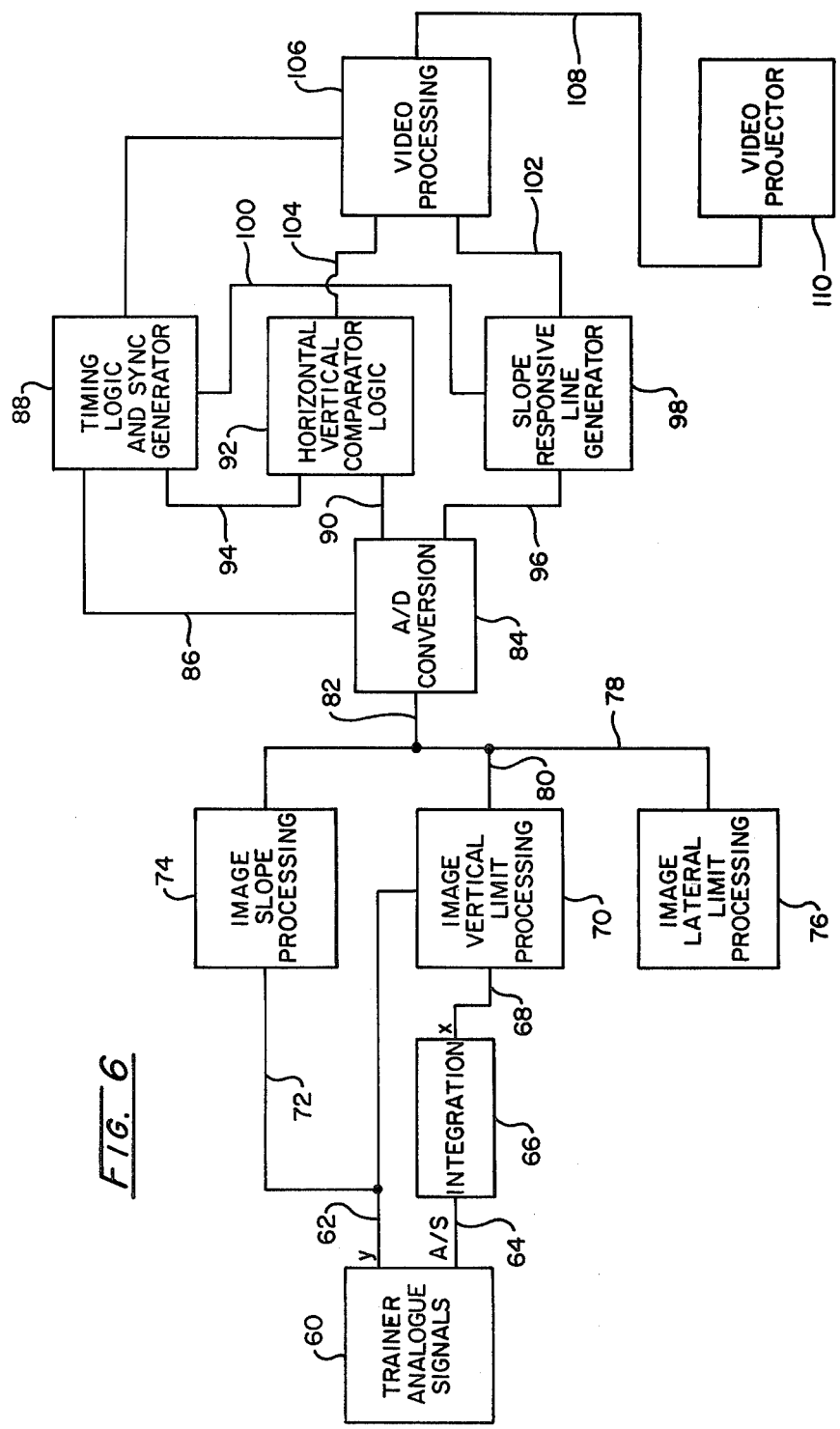
FIG. 6 is a block schematic diagram of the circuit arrangement of the invention.

Looking to the electronic implementation of the geometric theory for developing the image at screen 18, reference initially is made to FIG. 6 wherein an overview of the entire system is depicted in block logic fashion. The figure shows a block 60 representing the analogue signals developed by a conventional general aviation trainer. As indicated above, those signals required from the trainer 60 represent altitude or "y", as represented at line 62, as well as air speed, A/S, represented at line 64. Generally present as a voltage value at line 64, the air speed analogue signal is integrated as represented at block 66 to develop a signal, x, representing distance from the sighting point to a predetermined position with respect to the runway, as discussed earlier in connection with FIG. 3. The signal representative of this distance is directed along line 68, whereupon it is processed to develop the vertical limits of the image projected at screen 18. This function is represented at block 70. Note, that function 70 also operates in conjunction with the altitude signal present at line 62. The latter signal also is directed along line 72 to an image slope processing function represented at block 74. Function 74 evolves an analogue signal corresponding to the proper slope of the runway edge lines for any given instant in the operation of system. Constant value signals representing the lateral limits of parts of the image at screen 18 also are processed at a function represented at block 76. Inasmuch as constants are involved in this processing, no direct association thereof with the trainer analogue signals described in connection with block 60 are required. The outputs of functions 74 and 76 are present at line 78 which, additionally, is coupled with the output of function 70 at line 80. These outputs are submitted to an appropriate multiplexing arrangement (not shown) and through line 82 to an Analogue-To-Digital converter function represented by block 84. Timing control over converter function 84 is asserted from a timing logic and sync generator function represented at block 88, the association with the converter being represented by line 86. The now digitalized information developed at converter function 84 is asserted therefrom along line 90 to a Horizontal-Vertical Comparator Logic network which serves to establish the extent of image generation along the polar coordinates of the projected image. Synchronization of network 92 video image generation is derived from timing function 88 through line 94.

Digital data representing the progressively altering slope of the longitudinal edges of the images of the runway are presented from function 84 along line 96 to two identical line generators represented by block 98. Function 98 performs in conjunction with inputs from the timing logic function 88 as represented by line 100. The line generators represented by block 98 permit a significant simplification of the electronic generation of the image of the runway as it changes trapezoidal shape in the course of a landing procedure. To achieve this line generation, it will be observed that the function 98 operates to generate two lines which theoretically extend to infinity through a vanishing point located along the center line of the runway and positioned about 2 inches above the horizon line 40. This positioning of the vanishing point has been empirically found to achieve the most desirable runway image. The line generators at 98 operate as accumulators of progressively altering digital information represeative of the slope of the runway edges. The output of the slope responsive line generator function 98 is presented along line 102 with the output of the Horizontal-Vertical Comparator Logic from block 92 through line 104 to a video processing function represented by block 106. Within processing function 106, appropriate hues and colors are defined for an improved video image and the resultant outputs thereof at line 108 are utilized to develop the scene projected at screen 18 by a video projector represented at block 110.

Looking now to a more detailed discussion of the electronic implementation of the image generation, the Image Vertical Limit processing function described in connection with block 70 of FIG. 6 utilizes the geometric logic associated with expressions (7), (8) and (9) described above. Examination of those expressions reveals that each involves the constant, S, representing the distance from eye position 14 to screen 18, the aircraft altitude, y, which is present in the numerator of all the subject expressions, and the distance, x, which always is present in the denominator of the expression. The remaining components of the expression include the distance, N, representing the distance from the runway threshold to the sighting bar and the runway length, L.

Referring to FIGS. 7-12, the electonic implementation of these expressions is revealed in detail. In the figures, a voltage analogue signal (altitude) from Trainer Analogue Signal function 60 (FIG. 6) is developed at the input lines 120 and 122 of a balance input unity gain but inverting amplification stage represented generally at 124 in FIG. 8. Line 122 is coupled with the reference of the simulator (which may be ground), and the stage serves to provide a differential mode input for high common mode rejection. Additionally, coupled between line 122 and ground is an R-C network 126 incorporating a capacitor and resistor associated in parallel circuit relationship. In conventional fashion, stage 124 includes a feedback path 128 incorporating a resistor and filtering capacitor of values matched with the value of the resistor and filtering capacitor within network 126.

The output of amplification stage 124 is present at line 130 and is coupled to the input of a next operational amplification stage 132. The respective input and feedback loop resistors 134 and 136 of stage 132 are selected to achieve unity gain, while diodes 138 and 140 coupled respectively at the output and within an additional feedback loop of the stage serve to prevent the altitude related signal asserted thereat from achieving a value less than zero altitude. In effect, stage 132 serves a rectification function.

The output of the amplification stage 132 at line 142 is directed to one input terminal of a next operational amplification stage 144. Stage 144 serves a summer function, operating in conjunction with an offset potentiometer 146. Potentiometer 146 includes line 148 coupled between a reference voltage identified as +v and ground and incorporating resistors 150 and 152. The wiper arm 154 of potentiometer 146 is coupled through resistor 156 to the summing input of stage 144 and is present in combination with input resistor 158 positioned within line 142. In conventional fashion, a resistor 160 is incorporated within the feedback loop of stage 144, and a resistor 162 is coupled between ground and the opposite input to the amplifier. Summer stage 144 serves to provide a final correction to the y input of the system and the output thereof at line 164 is directed to the numerator input of a divider circuit 166.

The opposite input to divider circuit 166 incorporates an x component as described above, which component is developed from the air speed analogue signal of the trainer function as described earlier at block 60. Looking to FIG. 9, this analogue voltage signal is coupled to input line 170 of a unity gain operational amplifier stage 172. The opposite input thereto at line 174 is coupled to the reference level of the trainer, the differential mode input arrangement shown again being utilized for high common mode rejection purposes. In conventional fashion, the input resistor 173 at line 170, as well as the resistor 171 in the feedback loop of stage 172 are of identical value as are the value of resistors 175 and 176, thus achieving unity gain with common mode rejection.

The output of stage 172 is present at line 178 which extends to one contact of a manually operated switch $S_1$. The opposite contact of switch $S_1$ is present at line 180 which extends to ground. When switch $S_1$ is in contact with ground line 180, the apparent air speed of the trainer becomes zero such that the apparent movement of the aircraft may be halted in the course of a training maneuver. This feature provides an instructor an opportunity to halt the visualized forward motion of the trainer in order to explain error or the like on the part of the trainee in detail.

Assuming switch $S_1$ to be in contact with output line 178, the air speed signal thereat is transferred along line 182. Line 182 incorporates serially coupled resistors 184 and 186. Additionally, a line 188 incorporating resistor 190 is coupled from a point in line 182 intermediate resistors 184 and 186 to ground. The arrangement thus shown provides an attenuator function which serves to scale the value of the air speed signal to a level concomitant with the various signal functions evolved in the system. Such scaling generally is considered to be a matter of design choice.

Line 182 additionally is coupled to the input of an integrator stage 192. The opposite input of stage 192 is coupled through bias resistor 194 to ground, while the feedback loop thereof incorporates an integrating capacitor 196 in conventional fashion as well as a parallel disposed reset switch $S_2$. Switch $S_2$ serves to reset the integrator stage 192 to zero and is closed and reopened, for example, at the commencement of any given landing-training procedure. The switch may be operated both manually or automatically in response to an initial energization of the entire system. By integrating the air speed signal at amplification stage 192, the resultant signal at output 198 thereof is representative of the earlier described distance value, x. This distance signal is present at line 198 and is directed through the input resistor 200 of a unity gain operational amplifier stage 202. The opposite input to stage 202 is coupled to ground through resistor 204, while the feedback loop thereof incorporates a resistor 206 having a resistance value identical to that at resistor 200. Stage 202 acts as a summer and the summing input through resistor 212 thereof further incorporates an offset potentiometer 208 including a winding 210 coupled between a reference voltage identified as $+v$ and ground as well as a wiper arm incorporating resistor 212. Adjustment of the wiper arm provides for corresponding manual scaling to locate the position of the image of runway 32 at screen 18. The output of stage 202 is present at line 214 which is coupled to common input line 216 leading to parallel disposed operational amplifier stages 218 and 220. Each of the stages 218 and 220 exhibit unity gain, stage 220 having identically valued resistors 222 and 224 at the respective feedback loop and one input thereto and a bias resistor 226 at the opposite input. Similarly, stage 218 incorporates a feedback loop resistor 228 and input resistor 230 at one input thereof. A bias resistor 232 is coupled to the opposite input of stage 218. The input to stage 218 further includes an offset potentiometer 234 including a winding 236 coupled between negative power supply, $-v$, and ground and wiper arm 238 connected to the input of stage 218. With the arrangement shown, the output of stage 220 at line 240 has a value representative of the denominator, x-N, of expression (7), an expression defining the position of the runway threshold. Correspondingly, the output of stage 218 at line 242 is adjusted with respect to that at line 240 such that the value thereof corresponds with the denominator of expression (9), i.e., $x+L-N$, representing the end of runway 32. A variation of the difference between the two values may be provided by adjustment of offset potentiometer 236.

Tied to output 240 of amplification stage 220 is a constant current source network revealed generally at 244. Source 244 includes a line 246 extending from power supply, $+v$, to ground and incorporating a Zener diode 248 and resistor 250. Another line 252 extends from the power source to output line 240 and incorporates a resistor 254, PNP transistor 256 and divider resistors 258 and 260. The base of transistor 256 is coupled via line 262 to line 246 at a point intermediate diode 248 and resistor 250. The divider arrangement thus provided is tapped by line 264 and 266 to provide a signal tied to that representative of the threshold of the runway at line 240 but varying therefrom to define the respective uppermost and lowermost extent of the sighting bar at the center line of the runway. In this regard, the value at line 264 represents the top of the sighting bar, while that at 266 represents the bottom of the sighting bar. A slight variation in the value of the denominator of expression (8) will develop the appropriate signal value for this function.

The signals developed at lines 240, 242, 264 and 266 are directed to corresponding input channels of a 16 channel multiplexer located within dashed boundary 270 and having an initial eight input channels represented at block 272. The output of multipexer block 272 is present at line 274 and from that line the multiplexed signals are directed through a unity gain operational amplifier stage 276 (FIG. 8). Stage 276 includes matched input and feedback resistors represented respectively at 278 and 280, as well as a resistor 282 coupled between ground and the second input to the inverting amplifier. Stage 276 serves to prevent signals from line 274 assuming a negative value and, accordingly, incorporates diodes 284 and 286, respectively, at its output line 288 and within a secondary feedback loop. Line 288 extends to the denominator input of divider network 166 such that, depending upon the channel selection at muliplexer 272, expressions such as (7), (8), or (9) are developed at output 291 thereof.

Figure 9:
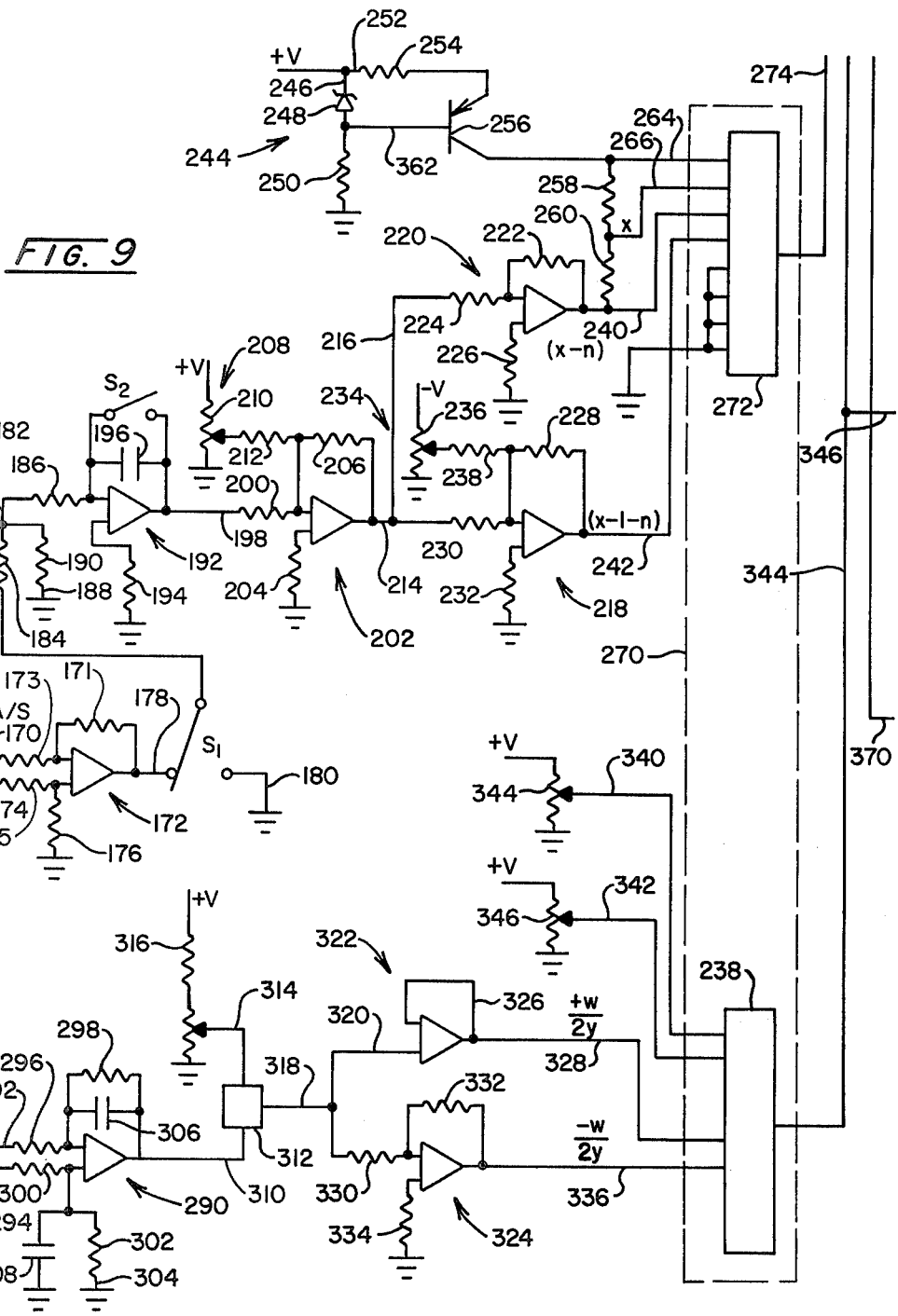
FIG. 9 is another portion of a schematic diagram of a circuit according to the invention.

As discussed above, the slope of the longitudinal runway edges is readily developed by dividing expression (13) by expression (9). When thus divided, the resultant expression (18) is a runway width related constant divided by, y, or altitude. The electronic implementation of this division is readily carried out. FIG. 9 reveals an amplification stage 290 formed as an operational amplifier having a differential mode input at lines 292 and 294. Line 292 is coupled with the positive altitude signal of the trainer control, as described at block 60, and the signal may be developed therefrom or from line 130. Line 292 incorporates one input resistor 296 which has a resistance value equaling a resistor 300 within opposite input line 294. Similarly, feedback resistor 298 has a resistance value equal to resistor 304 in line 304 and these resistor pairs provide a desired predetermined fixed gain. As in the case with stage 124, stage 290 includes capacitors 306 and 308 which serve a filtering function. The output of stage 290, present at line 310, is directed to the divisor input of a divider circuit 312. The dividend input to circuit 312 is a signal representing a constant which is developed from a potentiometer operating in conjunction with voltage source, $+v$, and including wiper arm 314 and winding 316. Winding 316 extends from the voltage supply, $+v$, to ground. The output (quotient) of divider circuit 312 is present at line 318 which, in turn, extends through line 320 to one input each of parallel associated unity gain amplification stages 322 and 324. Stage 322 is present as a non-inverting, unity gain operational amplifier having a feedback loop 326 and an output at line 328 which is represeative of the slope of the right edge (RR) of the runway as viewed from the trainer. Stage 324 also is present on an operational amplifier but is configured to operate in inverting unity gain fashion. The stage includes input and feedback resistors of identical resistance value identified respectively at 330 and 332, as well as a bias resistor 334 coupled between the second input of the amplifier and ground. The output of stage 324 is present at line 336 and represents the slope of the left edge of the runway (RL), the signal value being identical with that at line 328 but opposite in sign. Lines 328 and 336 extend to two input channels of a second component 338 of the multiplexer within dashed boundary 270.

Additionally asserted at multiplexer component 238 are signals at lines 340 and 342 which represent respectively the position of the right edge of the sighting bar or numbers (SR) and the corresponding position of the left side of the sighting bar (SL). Lines 340 and 342 are coupled with the output of potentiometers, the windings of which are shown respectively at 344 and 346 extending from voltage supply, $+v$, to ground.

Figure 10:
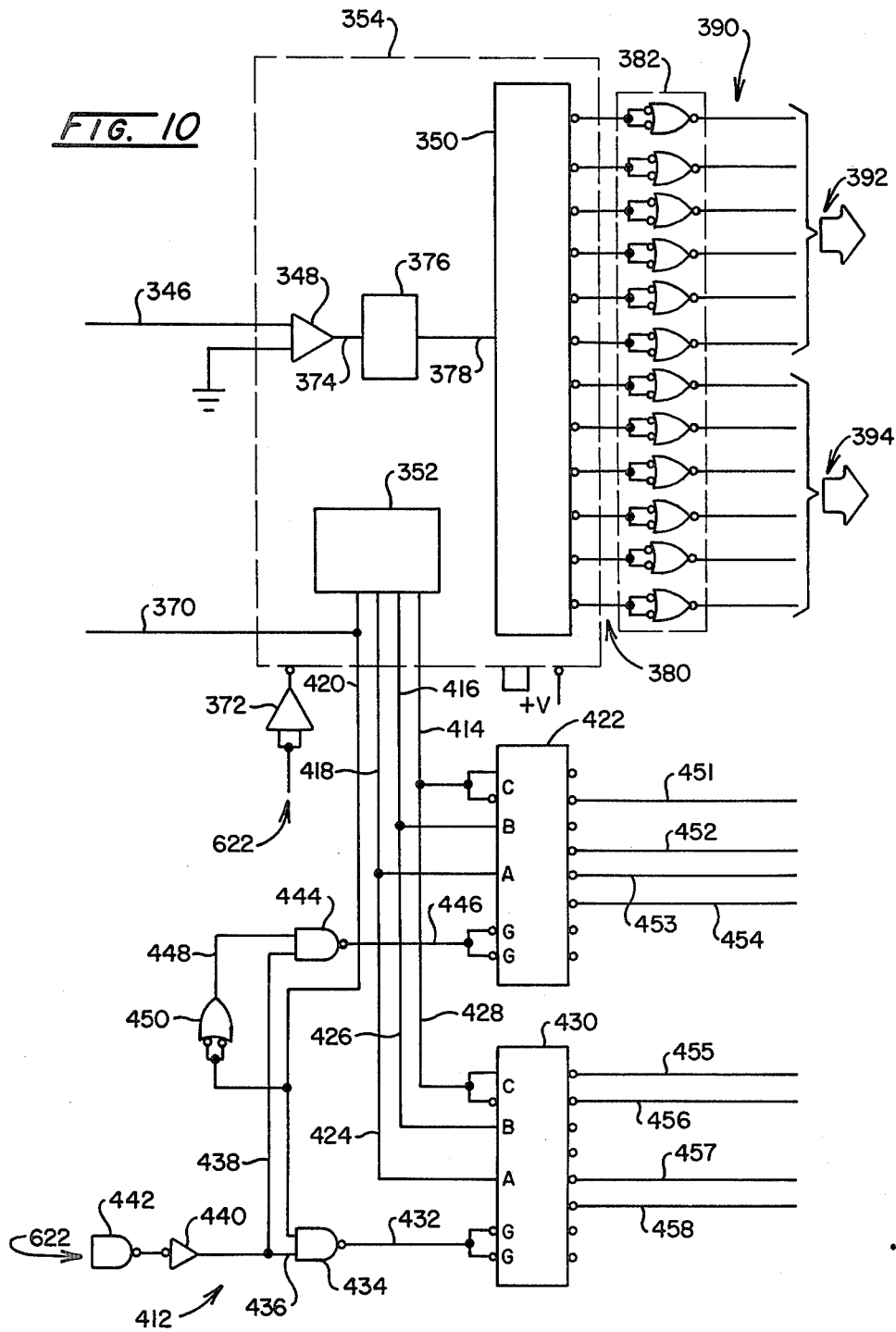
FIG. 10 is still another portion of a schematic diagram of a circuit according to the invention.

Looking additionally to FIG. 10, the output of multiplexer component 238 (FIG. 9) is asserted through line 344 to the input at line 346 of an amplifier 348. This amplifier is provided at the input of analogue to digital convertor represented by block 350. Converter 350 represents one component along with multiplexer components 272 and 238 and an address counter represented at boundary 352 of a Data Aquisition Module, for example, which may be present as a model SDM 853 manufactured by Burr-Brown Corporation. In the figure, components surrounded by dashed boundaries 270 and 354 are incorporated within such a module.

The output of divider circuit 166 ultimately is directed to input line 346, however, a final scale adjustment is asserted over the output signal thereof at line 291 by operational amplifier stage 356. Stage 356 includes input and feedback resistors shown, respectively, at 358 and 360 having value for the noted scale adjustment. In conventional fashion, the amplifier also includes a resistor, 262 coupled between its opposite input and ground. The output of stage 356 is present at line 364 which extends through a switch $S_3$ to common input line 346. Switch $S_3$ is a gate controlled analogue electronic switch which is operated from address counter 352. This control is represented by dashed line 366 communicating with a solid state control represented by block 368. Control over block 368 is asserted from the most significant bit output of this address counter 352 as represented by line 370. Switch $S_3$ functions to isolate line 364 during such times as the multiplexer channels at component 238 are in operation. When the switch is closed, the signals at line 364 are conveyed through line 344 to input line 346.

Address counter 352 essentially is a four bit binary counter which is incremented by a horizontal blanking pulse generated from the timing function of the system. The input of this horizontal blanking pulse to all of the data acquisition channels is represented by line 372.

The multiplexer treated signals at line 346 initially are treated at amplification stage 348, following which they are directed along line 374 for insertion to the input of a sample and hold function 376. The output of sample and hold function 376 is present at line 378 and is directed to the input of A/D converter 350. Converter 350 operates in conventional fashion, having, for example, a 12 bit resolution, and develops a digital output representing the analogue input thereto which is presented in binary form along the array of lines represented generally at 380. Each of the lines within the array thereof at 380 is directed into a buffer as illustrated by the grouping thereof at 382. These buffers may be present within modules described as quadruple, 2-input positive NAND buffers, for example, as marketed as type 7437. The dual inputs of the NAND buffers are connected as shown, in common with selected ones of the output lines at 380.

The binary data treated by the buffers 382 is delivered in a sequence established ultimately by the multiplexer function 270. The components of the module within dashed boundaries 270 and 354 are regulated in response to a continuous selected event, principally, the leading edge of the horizontal blanking pulse evolved in the timing logic described at block 88 and in detail later herein. Following the incrementing of the multiplexer 270, a very short interval amounting to about 30 microseconds is involved during which analogue to digital convertor 350 carries out conversion of the signal asserted thereto. The convertor then stops upon completing a conversion and the resultant binary coded signal at buffers 382 becomes available for transfer to selected ones of a plurality of hex, D-type flip-flops which are utilized as edge-triggered D-registers, or herein referred to as receivers for selectively receiving the binary information. Manufactured, for example as type 74174 by Texas Instruments, Inc., the device includes the circuit of registers present for each of the image informational signals passed through the available 16 channels within the multiplexer at 270. FIG. 10 shows that the information from buffers 382 is fed along twelve discrete lines, the grouping of which is identified generally at 390. The first six of these lines carrying the first six bits of the binary information are represented by arrow 392. Similarly, the lower six lines at grouping 390 are represented by an arrow 394.

Figure 11:
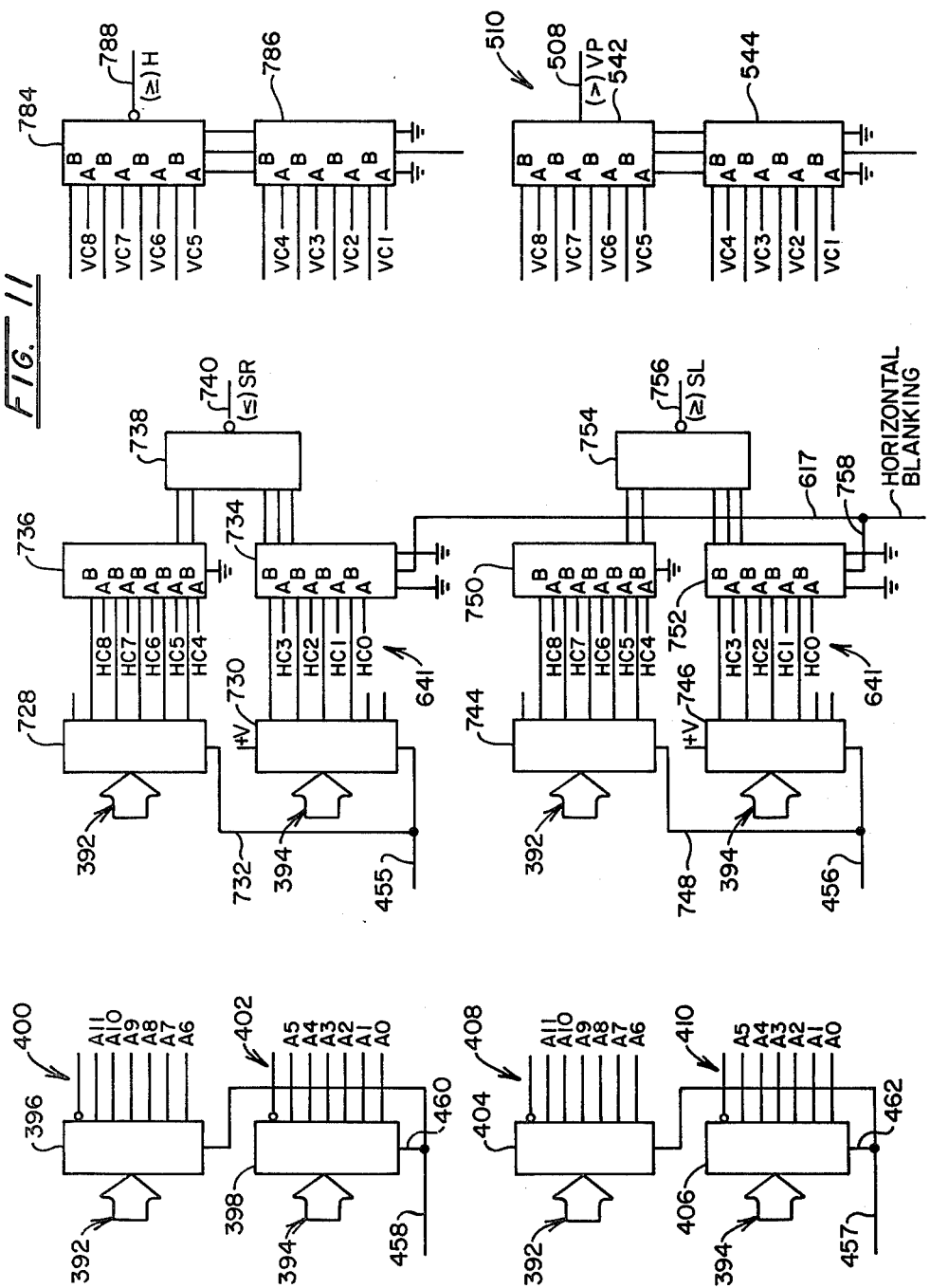
FIG. 11 is a schematic diagram showing components of a circuit utilized with the invention.

Referring to FIG. 11, line grouping 392 is shown coupled with the input of receiver 396 while line grouping 394 is shown coupled with the input side of a corresponding receiver 398. Receivers 396 and 398 act in concert, their combined outputs being represented by respective line groupings 400 and 402. The receivers 396 and 398 function to receive the binary number established at line groupings 392 and 394 and to pass it to their respective output 400 and 402 upon receipt of an enabling input. These receivers are intended to pass digital slope information for the left runway edge upon being so actuated. This information presented at lines A0–A11, ultimately reaches the slope responsive line generator function described earlier in connection with block 98 in FIG. 6 and in detail later herein. Similarly, upper line grouping 392 is coupled to the input of an identical receiver 404 which operates in concert with a second receiver component 406, in turn, having an input coupled with line grouping 394. Each binary number asserted through line groupings 392 and 394 to receivers 404 and 406 represents the instantaneous slope of the right edge of the runway and, upon appropriate actuation of the receivers 404 and 406, such information is passed to their outputs represented, respectively, by line groupings 408 and 410 and incorporating output lines A0–A11. Inasmuch as the output at line groupings 408 and 410 is identical in absolute value to that at groupings 400 and 402, the same alphanumerical designations are provided, it being understood that the two binary numbers involved differ from each other only by sign related bit representation.

Referring to FIG. 10, control over the actuation of receivers 396, 398, 404 and 406 as well as all receiving components within the system is carried out from a selector network revealed generally at 412 which operates in conjunction with address counter 352. Address counter 352 as well as multiplexer 270 operate to provide an incremental updating of all image information at a rate selected for convenience with respect to the periodic logic developing the ultimate T.V. raster. In this regard a convenient reference point for commencing this computational procedure is at the end of the horizontal blanking pulse extant at the end of each horizontal line sweep of the video output. During the ensuing horizontal trace interval, updating alteration may be made to the information content evolved at A/D converted 350. Actual updating of the noted register occurs on the trailing edge of a horizontal sync pulse. The horizontal blanking pulse input has been described at line 372 in connection with the data acquisition module and it is this pulse which serves to increment the address input of multiplexer 270 and initiate conversion at converter 350. The same pulse information is supplied to address counter 352 which develops a corresponding binary count at its output lines 414, 416, 418 and 420. Of these output lines, line 420 carries the most significant bit of the binary count. Counter 352 serves to count in binary fashion from 0 to 15, whereupon it recycles to repeat the process. As is evident, these counts or progressive numbers are utilized to access the multiplexer 270 channels in conventional sequential fashion, as well as to carry out selector logic at network 412. Each of the lines 416, 414 and 418 are coupled to the A, B and C input terminals of a 3-line to 8-line decoder 422 within network 412. Simultaneously, the same signals are applied via corresponding lines 424, 426 and 428 to an identical decoder 430. Decoders 422 and 430 may, for example, be type 74155 marketed by Texas Instruments, Incorporated. With the coupling shown, terminals A, B and C of decoder 422 receive binary numbers representing values 0 through 7, while the corresponding terminals of decoder 430 will be observed to receive binary information representative of multiplexer channel selections 8 through 15, it being recalled that the multiplexer 270 has a 16 channel capacity. Decoders 422 and 430 are interconnected to operate in alternating sequence, and this is achieved through selective control at the enabling input thereto. In this regard, the enabling terminal of decoder 430 is controlled from line 432 which, in turn, is coupled to the output of a NAND gate 434. One input to NAND gate 434 is coupled with line 420 which carries the most significant bit of address counter 352. The opposite input to gate 434 is derived from lines 436 and 438. Line 438 extends to a buffering gate 442 and incorporates an inverter 440. Buffer 442 selectively delivers along line 438 a horizontal sync pulse from line 622 generated from the timing logic sync generator described at block 88 in FIG. 6 and discussed in more detail later herein. Line 438 additionally extends to NAND gate 444, the output thereof at line 446 of which extends to the corresponding enabling terminal of decoder 422. The opposite input to gate 444 is provided from along line 448 which extends to line 420 and includes an inverter 450. With the arrangement shown, upon the alteration of value from 0 to 1 at line 420, one decoder is disabled, while the other is enabled to provide a capability for selecting any of 16 output positions to correspondingly activate the various receivers of the circuit, for example, those described at 396 and 398. The strobing of decoders 422 and 430 is in response to a horizontal sync pulse following the insertion of an addition from lines 414, 416 and 418. While, as indicated above, selector network 412 has a capability of 16 addresses represented at the outputs thereof, not all such channels are utilized in the system of the instant invention, it being understood, of course, that other features within the image of screen 18 may be developed through the use of additional binary data. Of the sixteen address channel availability of network 412, eight are used for the instant description and the outputs representing those eight are present at lines 451 through 458. Of these, note that line 458 extends to the strobe input of receiver 396 and through connected line 460 to the corresponding strobe input of receiver 398. Similarly, line 457 extends to the strobe input of receiver 404 and is connected through line 462 to the corresponding strobe input of receiver 406. When thus strobed, these receivers are loaded with a binary number representing the slope of the appropriate longitudinal runway edge. This number is introduced through the system to a slope responsive line generator described generally in connection with FIG. 6 at 98. Two of these generators are present in the system, each being identically structured in the manner shown in FIG. 16.

Figure 16:
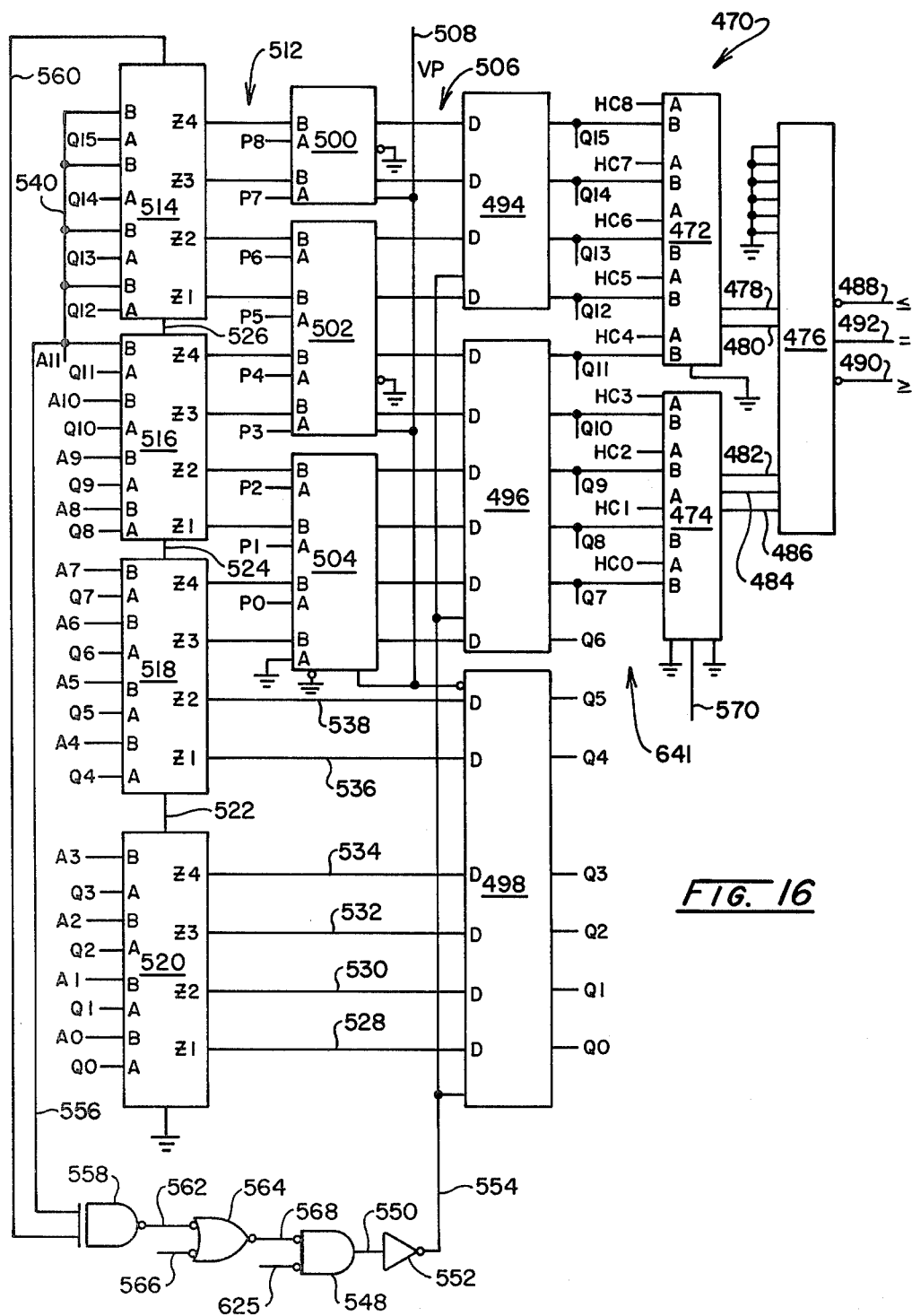
FIG. 16 is a schematic circuit diagram of one line generator as may be utilized in conjunction with the invention.

As a prelude to considering the circuitry of FIG. 16, a general overview of the geometric basis upon which it works may be of some value. Looking to FIG. 2J, a view of the image projected to screen 18 as seen by the trainee through windscreen 16 again is revealed, the image dimensions being similar to those shown in FIG. 2C. However, the left and right edges of runway 32 are shown, respectively, at dashed lines 32a and 32b as being projected to a point identified as "VP". This position represents a vanishing point and it is from this point, just above horizon 30, that the sloping runway edges are derived. The selection of the vanishing point as being just above the horizon line 30, generally about 2 inches, is one empirically developed to achieve a more realistic runway image. However, the philosophy for developing the runway edges in this manner evolves from a realization that the eye position 14, looking into infinity, will see all lines extending in that line of sight as ultimately converging to a vanishing point. By using this vanishing point then as a pivot from which the runway edges rotationally move, an ideally simplified technique for generating runway edges becomes available. Without this technique, each point along the edges of runway 32 would have to be computer calculated by complex geometric transformations. Note also, that FIG. 2J reveals the top edge of the runway at a level RT on screen 18 and the bottom of the runway at a level RB. Similarly, the top of the sighting bar is identified as ST and the level of the bottom of the sighting bar is identified at SB. The left side of the sighting bar is identified as SL and the right side thereof is identified at position SR, while the corresponding edges of runway 32 are identified as RL and RR.

Returning to FIG. 16, the circuit diagram for either line generator, i.e. right or left edge of runway 32 is revealed. In general, the line generator network shown generally at 470 initially functions to assertain both the vertical and horizontal position of the vanishing point upon the screen 18 image. As the generated raster achieves the position of the vanishing point, an accumulating function ensues wherein the locations of the generated lines are computed with respect to slope and developed at the raster. FIG. 16 reveals the presence of three, four-bit magnitude comparators 472, 474 and 476. Comparators 472 and 474 of this grouping are coupled to receive the nine bit binary informational output of a later described horizontal counter network within timing logic function 88. These bits, representing a portion of horizontal scan information are identified as $HC_0$–$HC_8$ and are asserted at the A input terminals of the comparators. The binary information thus provided at the A terminals of the comparators develops at a predetermined frequency from a 0 binary value to a predetermined value, such as 511, which represents the completion of one horizontal beam scan or sweep, thus to define a single line at the raster. The B input terminals of comparators 472 and 474 are coupled to receive a line generator numerical output number representative of the proper position of the runway edge for a given horizontal beam sweep. Thus, upon achieving an equality between the A and B terminals of these comparators, a signal may be derived utilized to unblank the beam and create a line image increment. Comparator 472 is coupled to comparator 476 through lines 478 and 480. Line 478 conveys information as to whether the values at terminals A are greater than those at terminal B (ATB), while line 480 conveys (ALB) information to comparator 476. Similarly, lines 482 and 484 convey the same information with respect to comparator 474, while line 486 conveys a condition of equality between the numbers at terminals A and B of the comparator. The resultant output at lines 488, 490 and 492, respectively, provides a signal representing a condition wherein the horizontal count is greater than the slope count, less than the slope count or an equality exists between the horizontal count position and the runway edge position. Comparators 472, 474 and 476 may be of the type 7485, marketed by Texas Instruments, Inc.

The numerical data asserted at the B terminal inputs to comparators 472 and 474 is identified by binary positions Q7–Q15 and is transferred to those comparators by two Hex, D - type flip-flops (edge-triggered D-registers) of a grouping of three thereof identified at 494, 496 and 498. These flip-flops function as short term memories within network 470 and serve to selectively transfer the more significant components of the binary line generator numerical values preset at the labeled output positions Q0 through Q15. Note in this regard, that positions Q0 through Q7 are not coupled with comparators 472 and 474. The binary values at outputs Q7 through Q15 ultimately are transferred, or modified, into the input, D, terminals of registers 494 and 496 from the outputs of multiplexers 500, 502 and 504. These multiplexers may be present at two-line to one-line data selectors marketed as type 74157 while the Hex D-type flip-flops described at 494, 496 and 498 are marketed as type 47174. The output connections between multiplexers 500, 502 and 504 with registers 494 and 496 are indicated generally at 506, while the select input to each of the multiplexers is asserted thereto from along line 508 from a network 510 described in connection with FIG. 11 which serves to derive positional information as to the vertical location of the vanishing point of the image as described in conjunction with FIG. 2J. The A terminal inputs to multiplexers 500, 502 and 504 are wired to receive a binary numerical input representing the horizontal location of the vanishing point on screen 18. Thus, where five hundred and eleven digital bits of information are utilized to define one horizontal sweep of a raster generating beam, and in accordance with the instant invention, the vanishing point is located substantially at the center of screen 18, the binary value asserted at terminals A may be equivalent to the value, 255. These inputs to the A terminals are identified by the sequence P0 through P8.

The B terminal inputs to multiplexers 500, 502 and 504 are represented by the line grouping 512 and extend from the "Z" outputs of four, four-bit binary full adders of a grouping of four thereof identified at 514, 516, 518 and 520. The carry out of adder 520 is coupled at line 522 to drive the carry in of adder 518, while the carry out of adder 518 is transferred by line 524 to the carry in of adder 516 and, similarly, the carry out of adder 516 is transferred to the carry in of adder 514 through line 526. Adders 514, 516, 518 and 520 may be those marketed as type 74283. Note that all four Z outputs of adder 520 are coupled with the D terminal inputs of register 498 by lines 528, 530, 532 and 534, while the lower two Z outputs of adder 518 are coupled through lines 536 and 538 to the uppermost D terminal inputs of register 498.

The A terminal inputs to adders 514, 516, 518 and 520 are connected with an appropriate one of the corresponding Q terminal outputs of registers 494, 496 and 498. In the interest of clarity in the drawing, the same alphanumerical designation is provided for the respective outputs and inputs of these components. By the arrangement, a feedback from registers 494, 496 and 498, representing runway edge slope as a binary number, is fed to the inputs of the sequence of adders 514, 516, 518 and 520 and, thus, an arithmetic accumulator function is developed for line generator network 470.

The opposite, B terminal inputs to adders 514, 516, 518 and 520 are provided from the corresponding output lines 400 and 402 of receivers 396 and 398 (FIG. 11) for one runway edge. These inputs are designated A0 through A11. Above the A11 input, the B terminal inputs are commonly coupled by sign bit line 540. As indicated earlier, two identical line generator networks as at 470 are utilized with the system of the invention, the inputs thereto being identically coupled and, thus for illustrative purposes, the same alphanumerical input designations are utilized. It should be understood, however, that the slope sign for the right edge of runway is opposite to that of the left edge of the runway.

Returning momentarily to FIG. 11, the derivation of the select signal at line 508 by network 510 is revealed. The vertical count timing logic evolved from network 88 represents a noninterlaced count valuation commencing at the top of screen 18 and leading to the bottom. The output from this vertical counter is asserted at the A input terminals of the comparators 542 and 544. At the commencement of any given field, the count asserted at terminals A of the comparators will commence from a binary Q value and count progressively in binary fashion to define a predetermined number of horizontal lines from the top to the bottom of the screen. The opposite input at the B input terminals of comparators 542 and 544 is a binary designation representing the position from the top of the raster of the vanishing point, VP. As is apparent, this is a fixed value. The output at line 508 at the commencement of a vertical count will remain in a state causing the selection of the constant data at the A terminals of multiplexers 500, 502 and 504, until such time as equivalence between the inputs of terminals A and B is achieved, at which time the signal at line 508 converts to a value of opposite designation for selecting the data at the B terminals of the noted multiplexers.

Returning of FIG. 16, when the value at line 508 is less than the count representing the position of the vanishing point, VP, the binary number asserted at input terminals P0–P8 is transferred to registers 494 and 496. Conversely, when the signal level at line 508 indicates that the vanishing point count has been reached, the binary signal from adders 514, 516 and 518 at input terminals B is transferred to the registers. Registers 494 and 496 transfer the received binary input at their D terminals through their output, Q, terminals to comparators 472 and 474 upon receipt of an actuating, horizontal sync related signal generated at function 88 and asserted within network 470 at line 625. When appropriately transferred through AND function 548, thence along line 550 through invertor 552 and into line 554, registers 494, 496 and 498 are clocked to effect the noted transfer. When the number transferred corresponds with the horizontal count input to comparators 472 and 474, a signal representing equivalence is derived at output 492 of comparator 476. Should the horizontal count input be less than the transferred number, a corresponding signal is asserted at line 490 and the opposite condition of the horizontal count being greater than the asserted number is reflected by a signal at output line 488.

As indicated earlier, the slope-related number asserted from the Q terminals of registers 494, 496 and 498 also is returned to the corresponding Q terminal inputs of adders 514, 516, 518 and 520 to develop an accumulator function. Assuming the number to be thus transferred or returned, the value of slope asserted into inputs A0-A11 then is added during the horizontal sync pulse interval with that reasserted or returned number for the next successive horizontal sweep. The bit capacity of adders 514, 516, 518 and 520 is relatively large with respect to that of their associated comparators. Only a predetermined portion of that slope designating value is utilized due to the limited number of digitally designated horizontally defined image components, i.e., 512 units are available across the raster.

Position A11 in the input to adder 516 represents the sign bit component of the asserted slope signal. Note that this input is additionally asserted along line 556 to one input of an exclusive OR gate 558. The opposite input along line 560 to gate 558 is derived from the carry out of adder 514. The signal developed at this line represents either the arithmetic overflow or underflow of the adder sequence, depending upon the sign of slope asserted. As a consequence, where the binary designation of the sign bit and the overflow are equivalent, a true output will be presented at line 562 permitting line generator network 470 to continue to produce runway edge images. However, should an arithmetic overflow or underflow be detected at line 560, the equivalence required at gate 558 will not be present and the value at line 562 will become not true. Thus, image generation is halted beyond that horizontal position represented by an over- or underflow. Without such control, the slope output would revert to a maximum value of opposite sign to create an unwanted sloping line misplaced upon the raster. Line 562 is coupled to one input of an OR function 564, the opposite input to which at line 566 carries the vertical blanking signal. The output of gate 564 is present at line 568 and represents the opposite input to gate 548. Control over network 470 is achieved at line 570 wherein the horizontal blanking pulse-related information is asserted at comparator 474 to terminate the information asserted to comparator 476 pending a next successive horizontal beam sweep.

In the discourse above, reference has been made to the horizontal and vertical blanking and sync pulses generally associated with the development of a raster. Additionally, horizontal and vertical counts have been utilized evolving this raster generation. Looking now to FIGS. 14 and 15, the timing function generating these digital inputs for the system is revealed in general at 572. Generally, two levels of vertical and horizontal counting functions are provided by function 572, the first "upper level" grouping of these counters being utilized to evolve the precise horizontal and vertical sync signals as well as blanking pulses. The second "lower level" grouping of counters responsive to the time frame control of the first grouping and serves the straightfoward function of generating the horizontal and vertical counting outputs. Accuracy is achieved in the initial horizontal and vertical count generators through the utilization of a clock synchronization arrangement.

Looking to the drawings, the basic oscillator of the system is represented at block 574 which, in conventional fashion, generates an output at line 576 having, for example, a 10.08Mh frequency. Line 576 is coupled to both inputs of a buffer inverter 578 having a clock pulse train output at line 580. These clock pulses serve to synchronize horizontal counter grouping 584–586 and later described vertical counter grouping 646–648 as detailed later herein.

The clock input from line 580 is directed through lines 581–583 to the clock inputs of a grouping of horizontal counters shown respectively at 584–586. A fragmentary representation of the unity (count level 1) output of counter 584 is shown in the timing diagram of FIG. 21A. Counters 584–586 are mutually coupled in cascade fashion and certain of the input terminals thereof are wired with a logic one, +v, to provide a preloading thereto of value 64. Thus, when actuated, these horizontal counters will commence counting at that value. In this regard, the counter shown may be of a type designated as 74161 which is a synchronous, fourbit binary counter. During the 15th combination of the counter a true condition is developed at the carry terminal thereof, C, at line 587 and directed to the Propagate, P, terminal of succeeding counter 585. Note that the C input terminal of counter 585 is loaded at logical one, +v, completing formation of the above "64" presetting of the counter grouping. This presetting is developed for the purpose of generating a horizontal blanking pulse with a minimum of gating. However, counters 584–586 serve to carry out a total division of 320. The T-enable input of counter 585 is coupled with logical one, while the outputs thereof at line 588–590 provide the 16, 32 and 64 bit logical outputs of the upper level horizontal counter system. The carry out terminal, C, of the counter is coupled along line 591 to the T-enable input terminal of counter 586. Note that the carry terminal C, of counter 584 is coupled with the P terminal of counter 586 from along lines 592 and 593. Counters 584–586 are enabled to count in correspondence with a synchronizing clock pulse input from line 580 by virtue of a signal asserted from lines 587, 592 and 593 to their P terminal inputs.

Figure 21A:
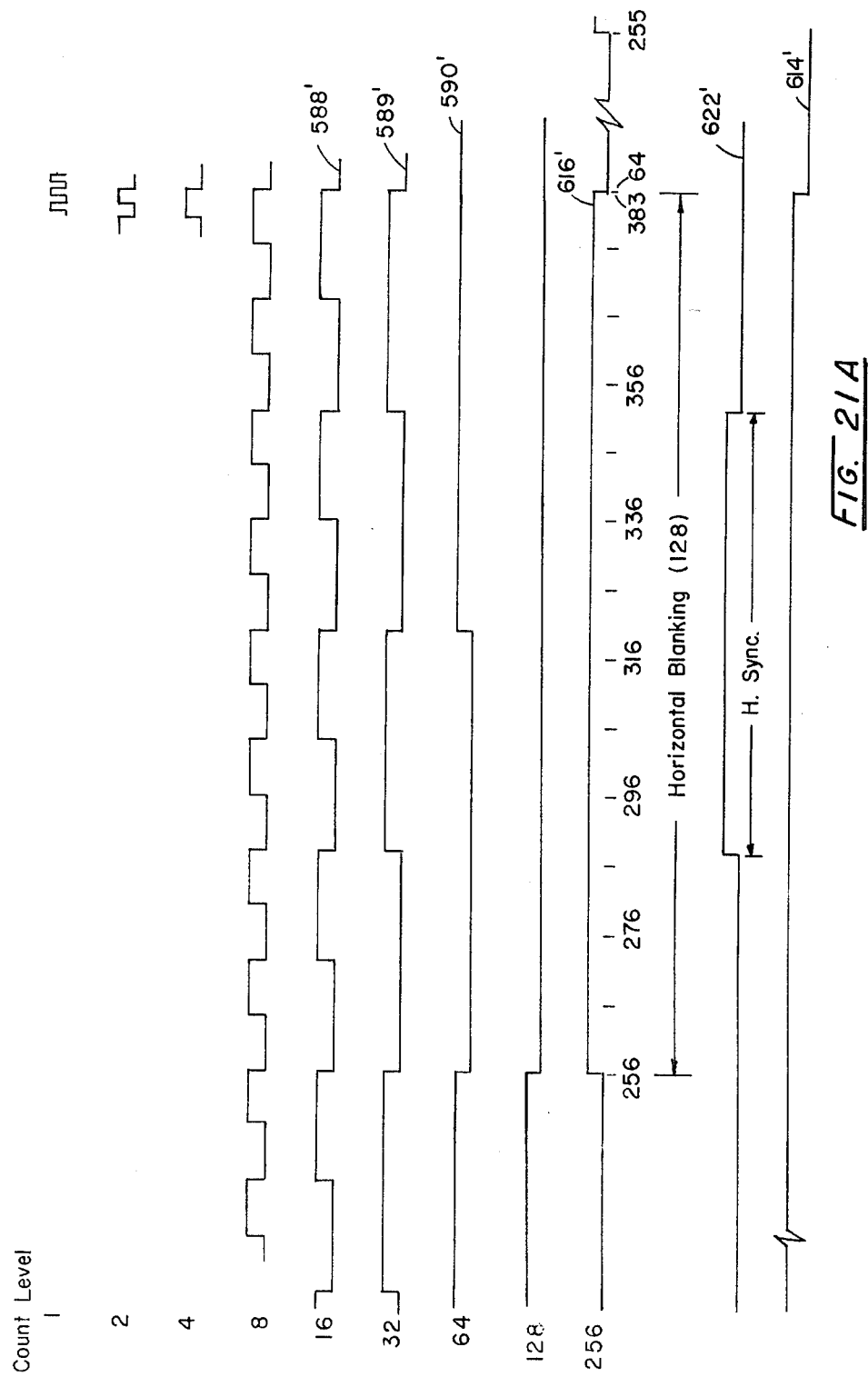

The T terminal input of counter 586 is coupled in cascading fashion with counter 585 through line 591, while the logical "256" output thereof is tapped at line 594. Note that the signal at line 594 represents the most significant bit of the horizontal counter grouping 584–586. The relative pulse positions of the signals at lines 588–590 and 594 are shown in FIG. 21A with corresponding primed numeration, while those levels not tapped for output utilization are identified by their appropriate logic levels, i.e., 1, 2, 4, 8, and 128.

Counters 584–586 and the components associated therewith provide a vernier form of control over those signals which define a horizontal line sweep. As such, the components develop a horizontal scan line commencing at a count value of 64 to which the horizontal counters are initiated and extends to a 383 count to again commence at 64, whereupon the count again extends to 383. This constitutes one horizontal scan line, a portion of which is horizontal blanking time. A total of 512 counts comprises an entire scan line. In general raster development, a synchronizing pulse is positioned within each of the horizontal blanking pulses. While the capability for interlacing is provided with timing function 572, it has been found that runway edge definition is adequate without that feature, thus in the instant embodiment, no interlacing is provided. As indicated above, counters 584–586 are synchronous and thus commence to count following their enablement as well as the receipt of the next ongoing clock pulse emanating from line 580. This synchronous loading is carried out by a multiple input AND function 596 having input lines 597–599 coupled respectively to lines 588–590, an input line 600 coupled to line 594 and a final input line 601 coupled to receive propagating signals from line 592. The output of gate 596 at line 602 is coupled to the load input terminal of counter 584 as well as the load input terminals of counters 585 and 586 through respective lines 603 and 604. Thus, upon the receipt of the 383rd count period representing the termination of a horizontal blanking pulse and scan, a signal is imposed along line 602 to load counters 584–586 by initializing them at a weighting of 64. Inasmuch as the counters are synchronous in nature, they will respond upon receipt of a next clock pulse emanating from line 580.

The noted 383rd period represents one division by 320 on the part of counters 584–586. It is the interval represented by this division, terminating in the 383rd transition of the counters, which provides one numerical bit utilized by the vertical count components of timing block 572. This 383rd count transition representing the noted division by 320 is presented as an output of the horizontal counters at lines 588, 589, 590 and line 605 which is coupled to line 600.

Figure 15:
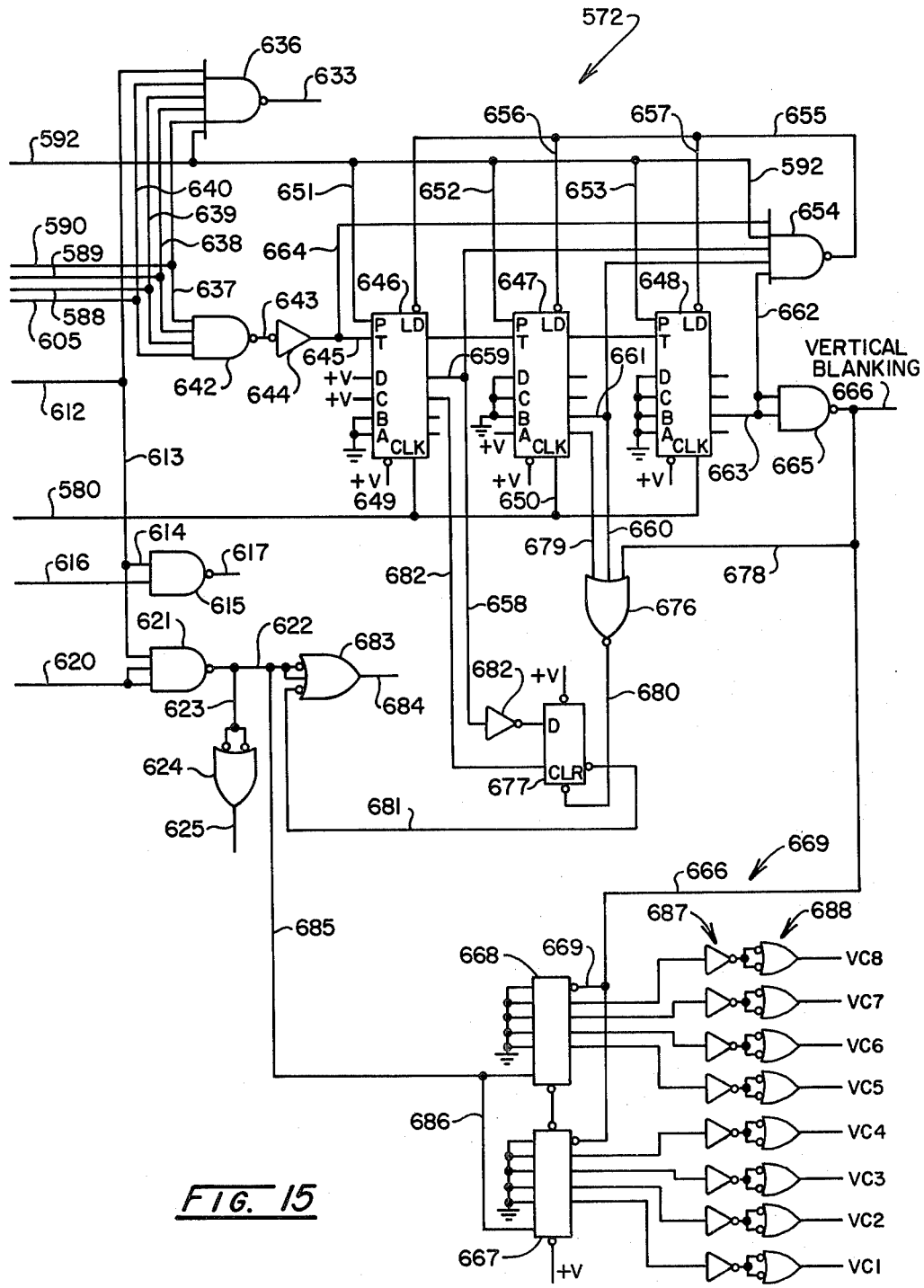
FIG. 15 is a schematic diagram of one portion of a circuit utilized with the invention.

As indicated above, while the above division by 320 counts will provide for interlacing logic at the raster of the system, this is not required for the instant trainer system utility. Accordingly, a divide-by-two function is provided at a network 606 which, when combined with appropriate anding logic, serves to cause block 572 to develop only every other available horizontal blanking pulse. Network 606 includes an inverter 607 having input coupled with line 594, the latter representing the most significant binary bit of the horizontal counters 584–586. The output of inverter 607 is present at line 608 and is introduced to a D type flip-flop 609, which may be present as a type 7474 and which is wired to carry out the divided-by-two function, having an output at line 612. Line 612, in turn, is coupled through lines 613 and 614 to one input of an AND gate 615 (FIG. 15). The opposite input to gate 615 is coupled through lines 616 and 600 to output line 594 of counter 586. The inputs to the anding function of network 615 with the most significant horizontal bit at line 594 are illustrated in FIG. 21A as curve 616′ and 614′. While the scaling factor involved in curve definition does not permit a full exposition at FIG. 21A of the transition of line 614, it should be understood that upon anding with a next succeeding blanking pulse at gate 615, the input at line 614 will remain low through the ensuing 383rd count transition, thus eliminating every other pluse on line 594, thus developing the horizontal blanking pulse.

The horizontal sync pulse of the system is developed, in conjunction with every other horizontal blanking pulse as accepted at gate 615. Developed inter alia, by a D - flip-flop which may be of the above noted type 7474 shown at 618, the horizontal sync pluse is formed within the horizontal blanking pulse interval. Such flip-flops as at 618 have three inputs and one output, the clock input of component 618 being derived from the bit of counter 585 with a weighting of 32 as provided at line 589. The D terminal input to component 618 is derived from line 590 and inverter 619. Note that line 590 represents the bit of counter 585 exhibiting a weighting of 64. The clear input to component 618 is developed from line 600 which, in turn, is coupled with the earlier described most significant bit of the horizontal counter grouping, while the output thereof is present at line 620 and is introduced as one input to an AND gate 621, the opposite input to which is provided from line 613 (FIG. 15). The horizontal sync pulse of the system is developed at the output line 622 of gate 621 and is represented in FIG. 21A at curve 622′.

Returning to flip-flop 618, a D-type flip-flop provides an output; for example, at line 620, which follows the value of the D input thereto in the presence of a clock pulse at line 589. For illustrative purposes, reference is made to curve 616′ in FIG. 21A which may be construed, for the instant analysis, as the value asserted at clear terminal line 600 of flip-flop 618. As long as the value at this clear terminal is low, no output may be generated at line 620 from flip-flop 618. However, with a high value at line 600, representing a horizontal blanking pulse, as well as a clocking pulse as represented at curve 589′ and an inverted value of input to the D terminal through inverter 619, a horizontal blanking pulse is generated, as shown at curve 622′. The resultant horizontal sync pulse is presented along line 620 to one input of gate 621 at which point it is anded with the output of divide-by-two network 606 at line 613. In consequence, there results a sync pulse at output line 622 at every developed horizontal blanking pulse. The signal at line 622 is, inter alia, directed along line 623 to each input of a NAND gate 624, the output of which is provided at line 625. This output represents a buffered horizontal sync signal which is asserted at one input to gate 548 of the line generators of the system, one of which has been described at 470. Note that NAND gate 18 carries out an OR function.

In developing horizontal information bits within the generated raster of the instant system, a horizontal scan is considered to incorporate 512 bit components. To establish the position of these components, a second lower, horizontal counting function is provided at network 626. Network 626 includes three, four bit binary counters 627–629 which may be of the earlier-described type 74161 and which are each clocked from line 580 through respective connecting lines 630, 631 and 632. The load input to network 626 is provided from line 633 which extends directly to counter 627 and through branch lines 634 and 635 to counter 628 and through line 634 to counter 629. Counters 627–629 are coupled in conventional cascading fashion to provide a progressive count output with numerical weighting from 0 to 511, as represented by the serial notation HC0-HC8. The count carried out at network 626 provides horizontal counting in the absence of presetting. Control over network 626 is developed from the noted upper counters from multiple AND gate 636 (FIG. 15). Four input lines thereto, 637–640 receive the 0 to 383 basic horizontal count data from counters 584–586 by virtue of their connection respectively with output lines 590, 589, 588 and 605. Gate 636, however, also is anded with the output of divide-by-two network 606 at line 613 and the synchronizing enabling signal from line 592. Thus, the load signal developed at its output line 633 provides for an accurate indicated earlier, the count carried out at network 626 is more gross in fashion than the vernier or highly controlled and synchronized count developed in the upper counters 584–586. Control over network 626 is developed from the noted upper counters from multiple AND gate 636 (FIG. 15). Four input lines thereto, 637–640 receive the 0 to 383 basic horizontal count data from counters 584–586 by virtue of their connection respectively with output lines 590, 589, 588 and 605. Gate 636, however, also is anded with the output of divide-by-two network 606 at line 613 and the synchronizing enabling signal from line 592. Thus, the load signal developed at its output line 633 provides for an accurate load or enabling input to network 626. Prior to the passage of the horizontal count signals HC0-HC8 to the various comparators heretofore described and to be described within the system of the invention, they are inverted and buffered. Looking additionally to FIG. 14A, this treatment is depicted in fragmentary fashion, the line grouping 638 showing the outputs of counters 627–629 in alphanumerically labeled fashion, the inverting being carried out by the series coupling thereof with inverters shown grouped at 639 and buffered by gate grouping 640 to evolve the labeled HC0–HC8 outputs at line grouping 641. Each of the gates at grouping 640 is a two input, positive NAND type 7437.

Returning to FIGS. 14 and 15, the outputs of counters 584–586 as developed at lines 637–640, in the absence of an input from lines 592 and 613, are coupled to the input of a AND function 642. The output of function 642 at line 643 is inverted at inverter 644 and extends through line 645 to the T-enable input of the initial counter of the cascade connected grouping thereof 646–648. As before, these vertical counters are synchronous four bit binary counters of type 74161. The clock input of counter 648 derives from line 580, while the corresponding input to counters 646 and 647 is provided, respectively, from lines 649 and 650 which, in turn, are coupled to line 580.

In general video practice, when the image tracing beam has reached the lower right hand corner of the picture tube it is returned to the upper left hand corner to commence to scan a next succeeding field. As in the case of horizontal scanning, the beam must be blanked out to prevent its retrace from appearing on the raster. A relatively longer vertical pulse is used for this purpose which is referred to as the vertical blanking pulse. Additionally, a vertical sync pulse will be incorporated within the interim of the vertical blanking pulse. Inasmuch as counters 646–648 utilize the output of counters 584–586, the pulse divided during their counting performance is equivalent to each 320 counts of the horizontal counters. Additionally, the division carried out by vertical counters 646–548 is the odd value 525 (providing an interlacing capability), the counters being initialized with a weighting of 28 advantageously avoiding excessive gating and defining an interval of 484 counts between value 28 and the transition from count values 511 to 512. At this transition, the vertical blanking pulse occurs for an interval of 41 counts, or until the count 552 is reached. At this time point, the counters are reloaded and initiated at the 28 count and, when enabled, will commence counting or incrementing upon the receipt of the next ongoing clock pulse.

As indicated above, vertical counters 646–648 are initialized at a 28 valuation and this is carried out by providing a logical one input to the C and D terminals of counter 646 as represented by +v in the drawing. Counters 646–648 are coupled in conventional cascade fashion and are enabled from line 592 by virtue of their connection therewith through respective lines 651–653. Upon being loaded to initialize at logical 28, the counters commence a 484 count corresponding with the interval required to define a field, followed by a vertical blanking pulse of 41 count length, the vertical blanking pulse transitioning on the 552nd pulse to carry out loading. A loading mode signal for the counters is developed at multiple input AND gate 654 which may be of the earlier described type 7430 having an output on the 552nd count transition at line 655. Line 655 leads, in turn, to the load terminal of counter 646. Corresponding inputs to the load terminal of counters 647 and 648 are provided, respectively, at lines 656 and 657.

The inputs to gate 654 are those developing a logical count of 552 which represents a division by 525. These binary inputs are provided as a count level eight from lines 658 and 659 extending from gate 646, a count level 32 input from lines 660 and 661 extending from counter 647 and a count level 512 deriving from counter 648 through lines 662 and 663. Additionally, a line 664 extends to gate 654 from line 645 at the input of counter 646. Further, line 592 extends to the input of gate 664.

Looking additionally to the timing diagram at FIG. 21B, the unity count level is represented. Inasmuch as an odd division is carried out by counters 646–648, it may be observed that the count level one output at counter 646 remains low during the transition from the 552nd to 28th count, an interval during which the above-described loading procedure takes place. This level deviation during the loading mode will be seen to be reflected throughout all curves of the diagram. FIG. 21B additionally shows the timing curves for each of the count levels on counters 646–648, and, where those levels are present at a particular numbered line, that line is reproduced on the appropriate curve in primed fashion. As is represented at 663' in FIG. 21B, the vertical blanking pulse corresponds with the logical 512 count output of counter 648 at line 663. Note, that the pulse extends an interval of 41 counts from 512 to 552, whereupon the loading mode described above transitions the counters to an initialized count value of 28. Returning to FIG. 15, the output at line 663 is directed through AND gate 665 which is present for buffering purposes. The output of gate 665 is present at line 666. Line 666, in turn, extends to the load input of vertical counter 667 and through line 669 to vertical counter 668. Counter 667 and 668 may be of the four bit binary variety, for example identified as type 74191, and are present in a network 669 which functions in similar fashion as network 626. Line 666 is coupled, inter alia, to input line 566 of the line generator networks as described at 470 in connection with FIG. 16.

The vertical sync pulse is generated by the interaction of NOR gate 676 and D type flip-flop 677. In this regard, the input to gate 676 includes the vertical blanking pulse from lines 666 and 678, the count level 32 of counter 647 from along line 660 and the count level 16 of that counter from line 679. The resultant output of gate 676 at line 680 is revealed at 680' in FIG. 21B and represents a condition of 512 not or 32 or 16 and is asserted at the clear terminal input of component 677. Thus, the vertical sync output of component 677 at line 681 is held off during any one of the aforesaid conditions at line 680. The clock input to flip-flop 677 is inserted from line 682 which extends to the output of counter 646 having a binary weighting of four. A curve representing this output is shown at 682' in FIG. 21B. The corresponding D input to flip-flop 677 is derived from line 658 and inverter 682 and thus represents the inverse of the count level eight condition at counter 646. As revealed at curve 681' in FIG. 21B, the vertical sync pulse thus is developed within the interval of the vertical blanking pulse. Line 681, the output of flip-flop 677, extends to an OR function 683 which combines the vertical sync signal with the horizontal sync signal from line 622 to evolve a composite sync signal at line 684.

Counters 667 and 668 of network 669 are driven from the horizontal sync pulse generated at line 622 and directed to the counters from along lines 685 and 686. The outputs of counters 667 and 668 are treated in fashion similar to the outputs of counters 627–629, being inverted by a grouping of discrete inverters shown generally at 687 and buffered by a similar grouping of two input positive NAND buffers shown generally at 688. Inventor 687 may be type 74SO4, while buffers 688 may be type 7437. The outputs of buffers 688 are identified by the sequence of vertical counts VC1-VC8 which are reproduced in the comparator logic described both earlier and later herein.

Returning momentarily to FIG. 2J, it may be observed that the top and bottom of runway 32, as observed at screen 18, are always defined by a horizontal line which, in the figure, is identified by the letters "RT" AND "RB". The geometric techniques defining these levels have been described earlier in connection with expressions (7) and (9).

Referring to FIGS. 8 and 9, when the denominator information concerning the runway top, RT, at line 242 is selected by multiplexer component 272 and divided at divider 166, it is converted to digital form at A/D converter 350 and asserted at register 700 and 702 through respective multi-line groupings 394 and 392. Register 700 and 702 (FIG. 12) are enabled to receive this binary information from along lines 453 and 704 upon the appropriate signal being presented thereat from selector network 412 (FIG. 10). Registers 700 and 702 may be earlier described type 74174 and when so enabled from lines 453 and 704, serve to transfer the received digital data to the output thereof represented respectively by line groupings 708 to the corresponding B terminal inputs of comparators 710 and 712. The A terminal inputs of comparators 710 and 712 are coupled to receive vertical counter data as developed at vertical count output netwwork 669. Inasmuch as the digital information passed from registers 700 and 702 represents the vertical level of the top of runway 32, when the vertical count asserted at terminals A equals or is greater than the level of the runway top, and output ($\geq$)RT is presented at line 714 representing that condition. This output signal is utilized to command the video portion of the system to create runway image.

In similar fashion, the runway bottom information (RB) is generated by a division including the denominator information at line 240 (FIG. 9) which is muliplexed at multiplexer component 272 and converted to digital form at converter 350 for presentation at line grouping 390 (FIG. 10). Upon appropriate selection thereof by network 412, an enabling signal is asserted along lines 454 and 716 to registers 718 and 720 as shown in FIG. 12. The inputs to register 718 and 720 are provided from respective line groupings 394 and 392 and, upon command from network 412, are transferred from the output of the registers to the B terminal inputs of respective comparators 722 and 724. The A terminal inputs to comparators 722 and 724 are derived, as indicated, from the outputs of vertical counter network 669 and the comparators are so interconnected that when the numerical value represented by the input to the A terminals thereof is less than or equal to the value asserted at terminals B, a signal condition representing a vertical designation less than or equal to runway bottom ($\leq$)RB, is presented at output line 726.

The right side of the sighting bar, SR, has been described in connection with FIG. 9 as being evolved at line 340 is selectively passed by multiplexer component 338 for conversion to binary form at converter 350. The resultant binary number is asserted from line groupings 392 and 394 to respective registers 728 and 730. When selected by an appropriate signal asserted through lines 455 and 732 from network 412, these numerical data are transferred to the B terminal inputs of respective comparators 734 and 736. The A terminal inputs of these comparators are coupled to receive the horizontal count output as developed at line grouping 641. The greater than or less than functional outputs of comparator 736 are coupled to an A and B input of a third comparator 738, while the corresponding greater than, equality, and less than outputs of comparator 734 are coupled to the corresponding inputs of comparator 738. The output of comparator 738 at line 740 is a signal representing a condition wherein the horizontal count is less or equal to the sighting bar right edge ($\leq$)SR.

The corresponding left side designation of the sighting bar, SL, is developed initially at line 342 and treated to evolve as a binary value at converter 350 for presentation along line groupings 392 and 394. These line groupings are shown in FIG. 11 as being coupled to the input of respective registers 744 and 746. These registers are actuated from network 412 functioning through lines 456 and 748 to respond to the asserted binary data. Upon being so actuated, the digital data asserted from line groupings 392 and 394 is transferred from the registers output of the B terminal inputs of respective comparators 750 and 752. The corresponding A terminal inputs of these comparators are coupled to receive the horizontal count information emanating from timing function 88 as presented at line grouping 641 thereof. The greater than and less than outputs of comparators 750 are coupled with the initial A and B terminal inputs of a third comparator 754, while the greater than, less than and equality outputs of comparator 752, are coupled with the corresponding inputs of the third comparator. The output of comparator 754 at line 756 develops a signal of predetermined value when the horizontal count evolved at line grouping 641 is greater than or equal to numerical designation for the left side of the sighting bar, ($\geq$)SL. A horizontal blanking pulse input is asserted at comparators 734 and 752 from lines 617 and 758. This input serves to clear the comparator network at the termination of each horizontal beam sweep. Registers 744 and 746 may be of the earlier described type 74174, while comparators 750, 752 and 754 may be of the earlier described type 7485.

The location of the top of the sighting bar, ST, is evolved by logic earlier described and involving data line 264 (FIG. 9) which is converted at convertor 350 and presented as a binary number at line groupings 392 and 394. As shown in FIG. 12, these line groupings are coupled respectively to registers 760 and 762. Registers 760 and 762 are actuated from selector network 412 through lines 451 and 764. Upon such actuation, the numerical data asserted at the inputs thereof are transferred to the outputs and then to the B terminal inputs of respective comparators 766 and 768. The A input terminals of these comparators are coupled to receive vertical count data from vertical count network 669. Under conditions wherein the vertical count is equal to or greater than the numerical value of the top level of the sighting bar, a predetermined signal condition ($\geq$)ST will be in evidence at output line 770. As in the earlier cases, receivers 760 and 762 may be type 74174, while the comparators 766 and 768 may be type 7485.

The bottom edge location of the sighting bar has been described as being derived initially utilizing a divisor developed at line 264 which is appropriately divided at component 166 and digitalized at convertor 350 for presentation through line groupings 392 and 394 as a binary value. As shown in FIG. 12, information presented therefrom is asserted at the input of respective registers 772 and 774. Upon appropriate actuation from selector network 412 through lines 452 and 776, the digital information from line groupings 392 and 394 is transferred to the B input terminals of respective comparators 778 and 780. The corresponding A terminal inputs of these comparators are coupled to receive the vertical count data evolved at network 669. The resulting output at line 782 from comparator 778 exhibits a predetermined signal condition ($\leqq$)SB, evidencing that condition wherein the vertical count is less than or equal to the numerical value for the location of the bottom of the sighting bar. This signal condition alters to the opposite binary value at an equivalency between the A and B terminals of comparators 778 and 780. Receivers 772 and 774 may be type 74174, while comparators 778 and 780 may be type 7485.

The image of horizon 30 generated at screen 18 remains stationary in accordance with the instant invention and thus the data utilized in generating it involves a comparison of vertical count positions within the generated raster. This function is carried out by two comparators which may be of the type 7485 and which are illustrated in FIG. 11 at 784 and 786. The binary number representing the predetermined vertical count at which horizon 30 is generated is inserted into the A terminals of comparators 784 and 786, while the B terminals thereof are coupled to receive the vertical count data generated at network 669. When the vertical count asserted at terminals A is greater than or equal to the count representing the position of horizon 30, a predetermined signal ($\geqq$)H will be present at output line 788 of comparator 784. This value will alter to the opposite binary sense at the point of equivalency between the numerical value asserted at terminals A and B.

Figure 18:
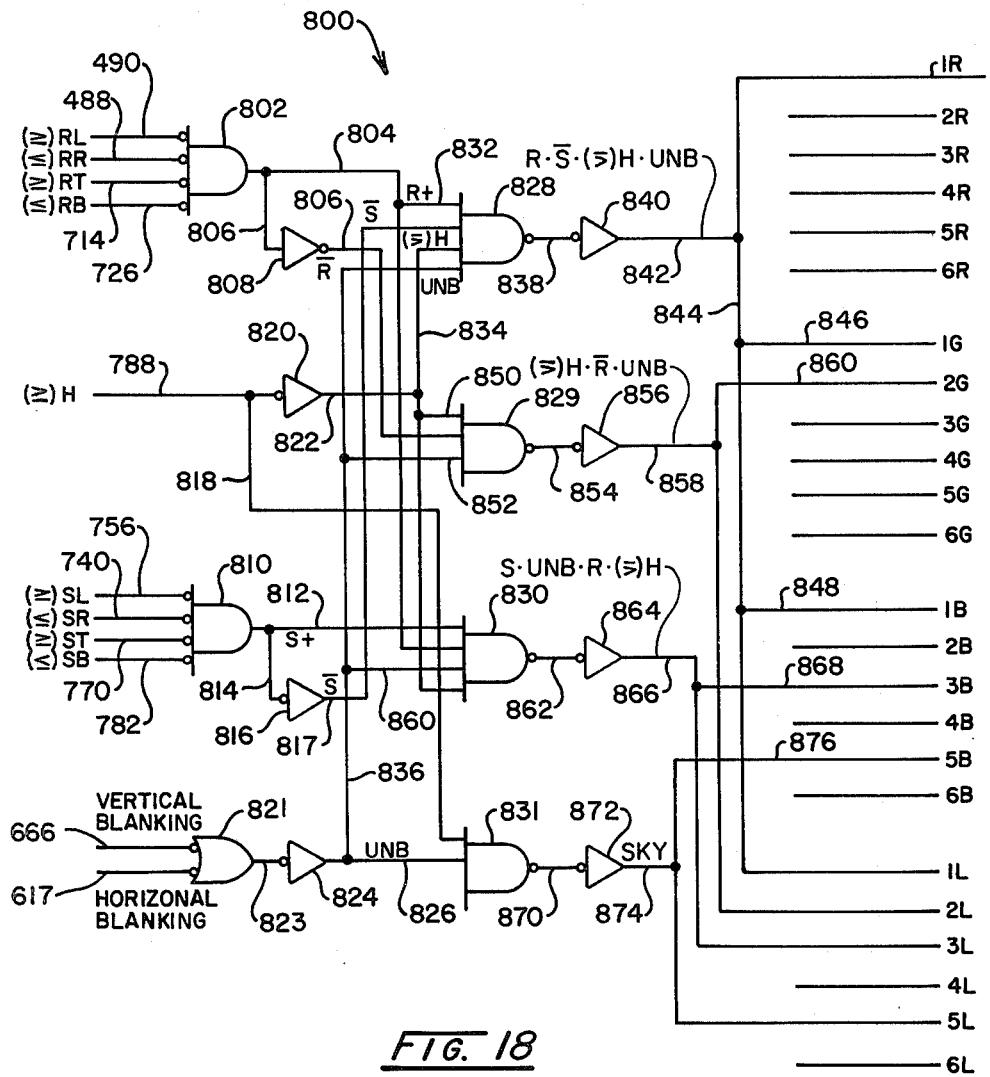
FIG. 18 is a schematic diagram of one portion of a video processor circuit utilized with the invention.
Figure 19:
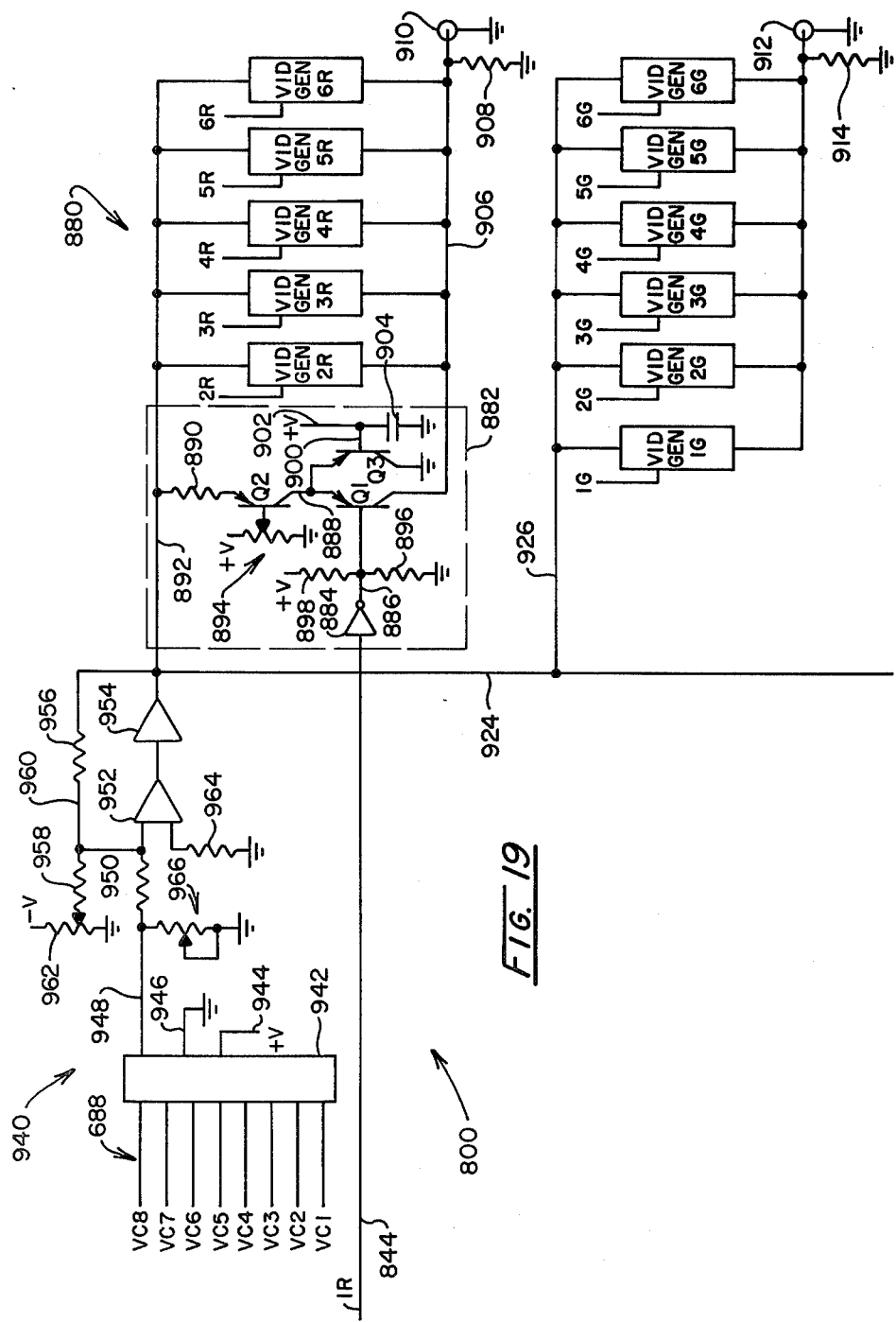
FIG. 19 is a schematic circuit diagram of another portion of a video processor circuit utilized with the invention.

Referring to FIGS. 18–20, circuitry representing the earlier discussed video processing function 106 of the invention is revealed in detail. This function receives the developed logic relating to position of runway and horizon to generate a proper image at the raster projected to screen 18. In the interest of clarity, the runway and sighting bar edge designations set forth in FIG. 2J are utilized in the drawing. Accordingly, reference additionally should be made to that figure in the discourse to follow.

The video processing circuitry revealed generally at 800 receives information defining the projected runway at a NOR gate 802. The inputs to NOR gate 802 include the earlier described logic signal representing a vertical count less than or equal to runway bottom, RB, as evolved at line 726. Correspondingly, another input to gate 802 is a signal representing a vertical count greater than or equal to runway top, RT, as evolved at line 714. Each of the line generator networks, one of which has been described at 470, develops a runway edge signal which is asserted at gate 802. One such signal represents a horizontal count greater than or equal to runway left, RL, which is developed at line 490 in the circuit of FIG. 16. An identical line generator is utilized to evolve a signal representing a horizontal count less than or equal to runway right, RR, the line asserted therefrom for illustrative purposes, being shown asserted at a line 488′ corresponding to line 488 in circuit 470. These simultaneously anded signals then are presented at an output line 804 representing a command, R+, to create runway image. A second line 806 is coupled with line 804 and extends through an inverter 808 to develop runway not logic signal, $\overline{R}$.

In identical fashion, the sighting bar data is developed at NOR gate 810. For example, when the horizontal count value of a given beam scan is greater than or equal to the left of the sighting bar, an appropriate signal is asserted at line 756. Where such horizontal count represents a value less than or equal to sighting bar right side, an appropriate signal is asserted at line 740. When the vertical count represents a value greater than or equal to the top of the sighting bar (i.e. below it) a corresponding signal is asserted at line 770, while the corresponding vertical count condition representing a value less than or equal to sighting bar bottom (below it) is provided by a signal at line 782. The development of these signal values has been described earlier herein in connection with the designated lines. Gate 810 performs the same function as gate 802, serving to achieve a logical anding of the inputs therefor. The output of gate 810 is present at line 812, and as labeled, represents a command to create sighting bar image. As above, line 812 is connected through line 814 and an inverter 816 to create the complement of the output signal, $\overline{S}$, representing a command not to create sighting bar image.

The signal representing a vertical count greater than or equal to the position of horizon 30, now designated H, has been described as being generated at line 788. This line is reproduced in FIG. 18 as being directed through line 818 as well as through an invertor 320 to line 822. Thus, the signal at line 822 represents a vertical count greater than or equal to the horizon position, i.e. below the horizon, and the signal at line 818 represents a vertical count less than the position of the horizon, or sky.

The vertical blanking pulses developed at line 666 and the horizontal blanking pulses developed at line 617 are directed to an OR function 821 the output of which is present at line 823 representing thereat a combined vertical and horizontal blanking signal. Line 823 is directed to the input of an inverter 824 such that the output thereof at line 826 represents an unblanking pulse, UNB.

The image logic information above developed is selectively directed to multiple input AND functions 828–831. Function 828 of this grouping is utilized to develop runway image definition and includes the R+ signal from line 804 as directed thereto from line 832, the sighting bar not, $\overline{S}$, from line 817, the greater than or equal to horizon vertical count signal from lines 822 and 834 and an unblanking input signal from lines 826 and 836. The resultant output of gate 828 is presented at line 838, inverted at inverter 840 and directed as a runway video input signal along lines 842, 844, 846 and 848 to a series of video generators. As labeled at line 842, the signal presented thereat represents the Boolean relationship: $R.\overline{S}.(\geqq)H.UNB$. Note, that the signal at line 844 is directed to one of six of available red video generator inputs 1R, as well as to one of six luminance inputs 1L. Line 846, coupled with line 844, leads to a corresponding green video generator input, 1G, while line 848 is coupled to a blue video generator input, 1B. In consequence, a generally white colored runway will be developed at the raster image.

AND function 829 receives data utilized in developing terrain below the horizon and outwardly of the runway periphery, herein termed "grass". In this regard, note that the input to gate 829 receives a signal representing a vertical count greater than or equal to horizon from lines 822, 834 and 850, a runway not, $\overline{R}$, signal from line 806, and an unblanking signal, UNB, from lines 836 and 852. The resultant output of gate 829 at line 854 is inverted at invertor 856 and presented along lines 858 and 860 respectively to luminance (2L) and green (2G) video generators. As labeled at line 858, this signal represents the Boolean expression, $(\geq)\overline{H.R.UNB}$.

AND function 830 develops sighting bar information and is shown coupled to receive an S+ signal from line 812, R+ signal from line 804, an unblanking signal, UNB, from lines 860, 836 and 826 and a horizon, $(\geq)$ H signal from line 834. The resultant output of gate 830 at line 862 is inverted at inverter 864 and presented as a sighting bar video input signal along lines 866 and 868, respectively, to a luminance generator (3L) and the blue generator (3B). Note that the sighting bar signal may be described by the expression: $S.UNB.R.(\geq)H$.

Gate 831 receives information for developing a sky image and, accordingly, receives a signal representing a vertical count less than the horizontal level along line 818 and an unblanking input from along line 826. The output of gate 831 is present at line 870 and is directed through an inverter 872 to lines 874 and 876 as a sky video input signal leading, respectively, to the blue generator (5B) and luminance generator (5L).

Looking to FIG. 19, the above noted video generators into which the red, green, blue and luminance inputs are directed are represented generally at network 880. These generators are identically structured, having inputs receiving the signals identified for red signal generation at 1R–6R, for green generation at 1G–6G, for blue generation at 1B–6B and for luminance generation at 1L–6L. That generator receiving runway, 1R, information via line 844 is shown in detail within a dashed boundary 822, it being understood that the remaining such generators are identically structured. Looking to the generator within boundary 882, it may be seen that the input thereto, 1R, is directed along line 844 into a buffer inverter 884, thence along line 886 to the base of a PNP transistor $Q_1$. The emitter of transistor $Q_1$ is coupled to the collector of a PNP transistor $Q_2$ which serves as a current source. In this regard, the emitter of transistor $Q_2$ is coupled through resistor 890 to bus 892, while the base thereof is coupled through a wiper arm to the winding of a potentiometer represented at 894. Bias to the base of transistor $Q_1$ is provided by a divider resistor combination including resistors 896 and 898 coupled to line 886. Additionally, a second PNP transistor $Q_3$ is associated in differential mode fashion with transistor $Q_1$ by virtue of the connection of its emitter with line 888 and its collector to ground. The base of transistor $Q_3$ is coupled through lines 900 and 902 to a fixed voltage, the latter line also including a filtering capacitor 904 connected between line 900 and ground. With the arrangement, the amount of current passed along the collector of transistor $Q_1$ and thence along line 906 determines the video voltage generated at resistor 908 coupled between line 906 and ground. This voltage is asserted as a video output at the red input of the raster generator, as represented at 910.

Green information is generated in identical fashion from the 1G–6G signals to evolve a green video output at the green input terminal 912 of the raster generator in accordance with the video voltage evolved at resistor 914, while, similarly, blue input to the raster generator, i.e. a video output is developed at terminal 916 in correspondence with the video voltage evolved at resistor 918, the connection from signal lines 1B–6B being labeled in the figure. The luminance generator input is developed from signals 1L–6L in similar fashion at terminal 920 in correspondence with the video voltage level developed at line 922. However, necessary composite video output sync signals also are asserted at terminal 920, as developed at the earlier described output line 684. Note, that the power supply input to the green video generators is provided from lines 924 and 926, the latter being coupled to line 892, while the corresponding power input to the blue video generators is provided from line 926 which, in turn, is coupled through line 924 to line 892, and the power supply to the luminance video generators is supplied from lines 924 and 892.

Control is asserted over the voltage supplied at line 892 by a network represented generally at 940. Network 940 serves to impose another visual cue in connection with the image generated at screen 18. In this regard, image reality may be improved where those portions of the image representing more distant objects are observed with less brilliance than those closer to the observer. Accordingly, a change in the intensity either of colors or luminance (for black and white performance) is developed at network 940 with respect to the vertical position of components of the image on the screen. Those objects at the top of the screen, for the geometry at hand, will be further from the observer than those at the bottom. To develop this intensity gradient, the output of the vertical counter network 669, as represented by line grouping 688, is introduced to the input of a digital-to-analog convertor 942. Convertor 942 may, for example, be a model DAC-371-8 produced by Hybrid Systems, Inc., Burlington, Massachusetts. Power supply input to convertor 942 is provided at line 944, while its ground connection is provided at line 946. The output thereof at line 948 is an analog representation of the digital input from line grouping 688 and is introduced through input resistor 950 to amplifier and booster stages 952 and 954, which cooperate to define an operational amplifier with enhanced drive capability. The output of booster 954 is present at the earlier described line 892 and the amplifier combination incorporates a feedback loop including resistor 956 within a line 960. Line 960, in turn, extends through resistor 958 to an offset potentiometer winding 962 which extends between −v and ground. The opposite input to amplifier stage 952 is coupled through resistor 964 to ground, while a gain defining potentiometer 966 is shown coupled between input line 948 and ground. By adjusting offset potentiometer 962 and gain potentiometer 966, the intensity from top to bottom of the image generated at screen 18 may be varied in accordance with the wishes of the operator.

Returning to luminous input terminal 920, inasmuch as luminance information is not generated when composite sync information is generated, the signals may be combined at terminal 920 to achieve raster formation generally in accordance with current industrial standards. The composite sync signal earlier described as being generated at line 684, however, is treated by a network represented generally at 970. Within network 970, the composite signal at line 684 is directed through a level changing inverter 972, thence through a current limiting resistor 974 to the base of a PNP transistor $Q_4$. A line 976 is coupled between line 974, a +v dc power supply and the emitter of transistor $Q_4$ and incorporates a bias resistor 978. The collector of transistor $Q_4$ is coupled through line 980 to a divider network including resistors 982 and 984, the common junction between which is coupled through line 986 to the base of NPN tranistor $Q_5$. The emitter of transistor $Q_5$ is coupled through resistor 988 to the opposite side of resistor 984 as well as to a $-v$ voltage supply, while the collector thereof is coupled through line 990 to line 992 which leads, in turn, to terminal 920. Network 970 provides a voltage swing for the composite sync signal ranging from a zero voltage level to a minus value, while the luminance component asserted at line 992 will range from zero to plus levels.

As indicated above, the video outputs at terminals 910, 912, 916 and 920 are connected directly to the corresponding inputs of a video projector. Only the latter terminal provides sync information, the luminance signals being utilized for black and white image generation only. While these outputs may be coupled with an encoder to evolve an NTSC type input, such treatment is not preferred inasmuch as it portends a lessening of image quality.

Since certain changes may be made in the above described system, method and apparatus without departing from the scope of the invention herein involved, it is intended that all matter contained in the description thereof or shown in the accompanying drawings shall be interpreted as illustrative and not in a limiting sense.

What is claimed is:

1. Visual display apparatus for use with a flight simulator system of a variety including a base supported aircraft trainer having a cockpit and front window-like opening for providing lines of sight from an eye location within said cockpit and having flight controls manipulative to cause said cockpit to move upon said base in roll, pitch and yaw attitudes about respective longitudinal, transverse and vertical axes, said system including a stationary display surface viewable from said eye location along said lines of sight, said surface being spaced from said eye location a predetermined distance, S, for displaying the video image of a fixed horizontal horizon below which extends the image of a runway of designated length, L, between the threshold and end thereof and half-width, w/2, defined between each lengthwise edge thereof, and a reference line, said system including means for generating altitude signals, y, substantially representative of the simulated height of said eye location above said imaged runway and means for generating velocity signals representative of the instantaneous simulated velocity and said trainer with respect to ground at the level of said runway, said apparatus comprising;

first circuit means for developing slope signals corresponding with the slopes of the images of said runway lengthwise edges as a quotient of a constant of value representing the distance of a said edge from said reference line divided by a value, y, representative of said instantaneous altitude;

timing circuit means for generating video raster controls including horizontal scan information and control signals developed through a predetermined digital sequence and vertical information and control signals developed through a predetermined digital sequence;

second circuit means for generating signals representing the predetermined vertical location of a vanishing point upon said raster;

line generator circuit means responsive to said second circuit means signal, said timing circuit means horizontal scan information signals and said first circuit means slope signals for generating output signals representing the locations of said runway image lengthwise edges;

third circuit means for developing signals representing imaging data at said runway threshold and end; and video processing means responsive to said line generator circuit means output signals, said third circuit means signals and said timing circuit means horizontal and vertical control signals for deriving video outputs.

2. The visual display apparatus of claim 1 in which said third circuit means comprises:

integrator circuit means responsive to said system velocity signals for developing a distance signal, x, representing the instantaneous horizontal distance extending substantially from said eye position to a predetermined threshold related location upon said runway; and runway threshold circuit means for developing a runway threshold signal corresponding with the image location of said runway threshold substantially as a quotient of the product of said altitude signal, y, and a signal corresponding with said predetermined distance, S, divided by said distance signal, x.

3. The visual display apparatus of claim 2 in which said third circuit means includes runway end circuit means for developing a runway end signal corresponding with the image location of said runway end substantially as a quotient of the product of said altitude signal, y, and a signal corresponding with said predetermined distance, S, divided by a signal representing the sum of said distance signal, x, and a signal corresponding with said runway length, L.

4. The visual display apparatus of claim 1 in which said third circuit means includes switching circuit means manually actuable to assert a said velocity signal of zero value at the input of said integrator circuit means.

5. The visual display apparatus of claim 1 in which said first circuit means slope signals are developed substantially as the said quotient of the expression: w/2y.

6. The visual display apparatus of claim 1 in which said line generator circuit means is configured to develop said signals by accumulatively summing said slope signals with signals representing the raster horizontal location of a next proceeding image increment of a said runway lengthwise edge, said accumulation substantially commencing with a correspondence of said second circuit means signal representing vanishing point vertical location and said timing circuit means vertical information signals.

7. The visual display apparatus of claim 6 in which said first circuit means slope signals are developed substantially as the said quotient of the expression: $\pm$w/2y.

8. The visual display apparatus of claim 6 in which said second circuit means digital signals representing said vertical location of a vanishing point are developed to locate said point at said display surface within a distance of about two inches above the level of said fixed horizontal horizon.

9. The visual display apparatus of claim 6 in which said line generator circuit means comprises:

comparator means having a first input coupled to receive said timing circuit means horizontal scan information and a second input for receiving runway edge position image increment signals and having an output for providing said output signals representing a digital correspondence between said first and second inputs;

adder means having a first input for receiving said first circuit means slope signals, a second input for receiving summed slope signals for developing a summation of said signals at said first and second inputs at an output thereof;

data selector means having a first input for receiving said adder means output summed signal and a second input for receiving a signal representing the horizontal position of said vanishing point at said raster and actuable in response to a said second circuit means signal representing vertical locations at said image above said vanishing point to present said vanishing point horizontal position signal at the output thereof and actuable in reponse to a said second circuit means signal representing vertical locations at said image at and below said vanishing point to present said summed signals at the output thereof; and memory means having an input for receiving said data selector means selected signals from the said output thereof, and actuable to transfer said received signals to said comparator means second input and to said adder means second input.

10. The visual display apparatus of claim 9 in which said memory means is actuable in response to a said horizontal scan control signal generated by said timing circuit means.

11. The visual display apparatus of claim 1 in which said timing circuit means comprises:

an oscillator for producing a train of pulses at a constant predetermined frequency;

horizontal counter means including a plurality of cascade coupled digital synchronous horizontal counters, each connected to receive said oscillator pulses at the clock terminal input thereto, each said counter having load, carry, P-enable and T-enable inputs and binary digital outputs, gate means responsive to a coincidence of select ones of said digital outputs and having an output coupled with said load terminals for initiating said counters in response to a count coincidence at the input thereto, and horizontal logic circuit means responsive to said digital outputs to develop said horizontal scan countrol signals as video horizontal blanking and horizontal sync signals;

vertical counter means including a plurality of cascade coupled digital synchronous vertical counters each connected to receive said oscillator pulses at the clock terminal input thereto, each said counter having load, carry, P-enable and T-enable inputs and binary digital outputs, input gate means responsive to the coincidence of said select digital outputs of said horizontal counter means for providing pulse inputs to the T-enable input of the initial one of said cascade connected vertical counters, gate means responsive to a coincidence of select ones of said digital ouputs and having an output coupled with said vertical counter means load terminals for initiating said counters in response to a count coincidence at the input thereto, and vertical logic circuit means responsive to said vertical counter digital outputs to develop said vertical control signals as video vertical blanking and vertical sync signals; and the carry output terminal of the initial one of said cascade connected horizontal counters being connected with each P-enable terminal of each said vertical counter to effect a synchronization thereof with said oscillator pulses.

12. The visual display apparatus of claim 1 in which said third circuit means comprises:

integrator circuit means responsive to said system velocity signals for developing a distance signal, x, representing the instantaneous horizontal distance extending substantially from said eye position to a predetermined threshold related location upon said runway;

runway threshold circuit means for developing a runway threshold signal corresponding with the image location of said runway threshold substantially as a quotient of the product of said altitude signal, y, and a signal corresponding with said predetermined distance, S, divided by said distance signal, s; and runway end circuit means for developing a runway end signal corresponding with the image location of said runway end substantially as a quotient of the product of said altitude signal, y, and a signal corresponding with said predetermined distance, S, divided by a signal representing the sum of said distance signal, x, and a signal corresponding with said runway length, L.

13. The visual display apparatus of claim 12 including fourth circuit means responsive to said timing circuit means vertical information signals for deriving a signal representative of the level of said horizontal horizon at said video image.

14. The visual display apparatus of claim 13 in which said video processing means comprises:

first gate means responsive to said line generator circuit means output signals, to said third circuit means runway threshold signal and said runway end signal for developing a runway signal;

second gate means responsive to said timing circuit means horizontal scan control signal, and said vertical control signal for developing unblocking signals;

first network means responsive to said fourth circuit means signal for developing a horizon signal representing an image position at or lower than said fixed horizontal horizon;

third gate means responsive to said runway signal, said unblocking signals and said horizon signal for developing a runway video input signal; and video generator means responsive to said runway video input signal for developing said video outputs.

15. The visual display apparatus of claim 12 further including:

fifth circuit means coupled with said third circuit means runway threshold circuit means for first developing sighting bar top and sighting bar bottom image signals as respective quotients of the product of said altitude signal, y, and a signal corresponding with said predetermined distance, S, divided by said distance signal, x, increased respectively by first and second predetermined constant signal values;

sixth circuit means for deriving first and second constant value signals corresponding respectively with the left and right edges of a said sighting bar; and said video processing means is responsive to said sighting bar top, sighting bar bottom and sixth circuit means first and second constant value signals to derived video outputs providing for the imaging of a sighting bar.

16. The visual display apparatus of claim 12 in which said third circuit means includes switching circuit means manually actuable to assert a said velocity signal of zero value at the input of said integrator circuit means.

17. The visual display apparatus of claim 12 in which said first circuit means slope signals are developed substantially as the said quotient of the expression: $\pm w/2y$.

18. The visual display apparatus of claim 12 in which said line generator circuit means comprises:

comparator means having a first input coupled to receive said timing circuit means horizontal scan information and a second input for receiving runway edge image increment signals and having an output for providing said output signals representing the digital correspondence between said first and second inputs;

adder means having a first input for receiving said first circuit means slope signals, a second input for receiving summed slope signals for developing a summation of said signals at said first and second inputs at an output thereof;

data selector means having a first input for receiving said adder means output summed signal and a second input for receiving a signal representing the horizontal position of said vanishing point at said raster and actuable in response to a said second circuit means signal representing vertical locations at said image above vanishing point to present said vanishing point horizontal position signal at the output thereof and actuable in response to a said second circuit means signal representing vertical locations at said image at and below said vanishing point to present said summed signals at the output thereof; and memory means having an input for receiving said data selector means selected signals from the said output thereof, and actuable to transfer said received signal to said comparator means second input and to said adder means second input.

19. The visual display apparatus of claim 18 in which said first circuit means slope signals are developed substantially as the said quotient of the expression: $w/2y$.

20. The visual display apparatus of claim 18 in which said memory means is actuable in response to a said horizontal scan control signal generated by said timing circuit means.

21. The visual display apparatus of claim 18 in which said timing circuit means comprises:

an oscillator for producing a train of pulses at a constant predetermined frequency;

horizontal counter means including a plurality of cascade coupled digital synchronous horizontal counters, each connected to receive said oscillator pulses at the clock terminal input thereto, each said counter having load, carry, P-enable and T-enable inputs and binary digital outputs, gate means responsive to a coincidence of select ones of said digital outputs and having an output coupled with said load terminals for initiating said counters in response to a count coincidence at the input thereto, and horizontal logic circuit means responsive to said digital outputs to develop said horizontal scan control signals as video horizontal blanking and horizontal sync signals;

vertical counter means including a plurality of cascade coupled digital synchronous vertical counters each connected to receive said oscillator pulses at the clock terminal input thereto, each said counter having load, carry, P-enable and T-enable inputs and binary digital outputs, input gate means responsive to the coincidence of said select digital outputs to the T-enable input of the initial one of said cascade connected vertical counters, gate means responsive to a coincidence of select ones of said digital outputs and having an output coupled with said vertical counter means load terminals for initiating said counters in response to a count coincidence at the input thereto, and vertical logic circuit means responsive to said vertical counter digital outputs to develop said vertical control signals as video vertical blanking and vertical sync signals; and the carry output terminal of the initial one of said cascade connected horizontal counters being connected with each P-enable terminal of each vertical counter to effect a synchronization thereof with said oscillator pulses.

22. The visual display apparatus of claim 21 including fourth circuit means responsive to said timing circuit means vertical information signals for deriving a signal representative of the level of said horizontal horizon at said video image.

23. The visual display apparatus of claim 22 in which said video processing means comprises:

first gate means responsive to said line generator circuit means output signals, to said third circuit means runway threshold signal and said runway end signal for developing a runway signal;

second gate means responsive to said timing circuit means horizontal scan control signal, and said vertical control signals for developing unblocking signals;

first network means responsive to said fourth circuit means signal for developing a horizon signal representing an image position at or lower than said fixed horizontal horizon;

third gate means responsive to said runway signal, said unblocking signals and said horizon signal for developing a runway video input signal; and video generator means responsive to said runway video input signal for developing said video outputs.

24. The visual display apparatus of claim 22 in which said distance, S, is about eight feet.

25. The visual display apparatus of claim 14 in which said video processing means includes means for varying the intensity of said video outputs from a most diminished level during scanning at the uppermost region with respect to vertical of said raster to a highest level during scanning at the lowermost region with respect to vertical of said raster.

26. The method for simulating visual aircraft flight cues comprising the steps of:

providing a base supported aircraft trainer having a cockpit and front window like opening for providing lines of sight from an eye location within said cockpit and having flight controls manipulative to cause said cockpit to move upon said base in roll, pitch and yaw attitudes about respective longtitudinal, transverse and vertical axes, said trainer generating altitude signals, y, substantially representative of the height of said eye location above an imaged runway within said lines of sight, said runway having an assigned half-width, w/2, defined between each lengthwise edge thereof and a reference line, said runway having a designated length, L, and means for generating velocity signals representative of the instantaneous velocity of said trainer with respect to ground at the level of said runway;

providing a stationary display surface viewable from said eye location along said lines of sight, said surface being spaced from said eye location a predetermined distance, S;

generating a video raster and displaying said raster at said display surface;

generating a fixed, horizontal horizon line image signal;

generating slope signals corresponding with the slopes of the said lengthwise edges of said runway image in correspondence with a quotient of the value representing the distance of a said edge from said reference line divided by a value representative of said instantaneous altitude, y;

generating signals representing the predetermined vertical location of a vanishing point within the periphery of said raster;

generating signals representing the position of increments of said runway longitudinal edges extending from said vanishing point at the slopes defined by said slope signals;

generating signals representing imaging data of said runway threshold and end;

processing said generated signals to generate video outputs; and treating said video outputs to provide an image at said raster.

27. The method of claim 26 wherein said predetermined distance, S, is selected to length sufficient to avoid conflict between geometric and binocular parallax depth perception.

28. The method of claim 26 wherein said predetermined distance, S, is about eight feet.

29. The method of claim 26 wherein said runway threshold image signal is generated by the steps comprising:

integrating said velocity signals to develop a distance signal, x, representing the instantaneous horizontal distance extending substantially from said eye position to a predetermined location upon said runway; and generating said runway threshold data signal as a quotient of the product of said altitude signal, y, and a signal corresponding with said predetermined distance, S, divided by said distance signal, x.

30. The method of claim 29 wherein said runway end imaging data signal is generated as a quotient of the product of said altitude signal, y, and a signal corresponding with said predetermined distance, S, divided by a signal representing the sum of said distance signal, x, and a signal representing said designated length, L.

31. The method of claim 26 in which said slope signals are generated substantially as the quotient of the expression: w/2y.

32. The method of claim 26 wherein said video image is projected to said display surface from a location adjacent said trainer.

33. The method of claim 26 wherein said runway edge signal generation is carried out by accumulatively summing said slope signals with signals representing the raster horizontal location of a substantially next preceding image increment of a said runway lengthwise edge, said accumulation commencing at the vertical location of said vanishing point upon said raster.

34. The method of claim 26 wherein said location of said vanishing point is about two inches above said horizon.

35. The method of claim 26 wherein said raster image at said display surface is extent in area to be included by substantially all said lines of sight from said eye location projecting through said front window.

36. A system for aircraft flight simulation comprising:

a base supported aircraft trainer having a cockpit and front window-like opening for providing lines of sight from an eye location within said cockpit and having flight controls manipulative to cause said cockpit to move upon said base in roll, pitch and yaw attitudes about respective longitudinal, transverse and vertical axes, said trainer including means generating altitude signals, y, substantially representative of the height of said eye location above an imaged runway within said line of sight, said runway having edges spaced from a reference line a width, w/2 and a designated length, L, and means for generating velocity signals representative of the instantaneous velocity of said trainer with respect to ground at the level of said runway;

a stationary, generally vertically oriented display surface viewable from said eye location along said lines of sight, said surface being spaced from said eye location a predetermined distance, S;

video imaging means for imaging a video raster at said display surface;

first circuit means for developing slope signals corresponding with the slopes, with respect to vertical, of the images of said runway lengthwise edges, said slope signals being developed substantially as the quotient of the expression: $\pm w/2y$;

timing circuit means for generating video raster controls including horizontal scan information and control signals developed through a predetermined digital sequence and vertical information and control signals developed through a predetermined digital sequence;

second circuit means responsive to said timing circuit vertical information and to a signal substantially representing a predetermined vertical position upon said raster for developing a signal representing the predetermined vertical location of a vanishing point upon said raster;

line generator circuit means responsive to said timing circuit means horizontal scan information signals and said first circuit means slope signals for accumulatively summing said slope signals with signals representing the raster horizontal location of a substantially next preceding image increment of a said runway lengthwise edge, said accumulation commencing substantially with a correspondence of said second circuit means signals and said timing circuit means vertical information signals for generating output signals representing the locations of said runway lengthwise edges;

integrator circuit means responsive to said trainer velocity signals for developing a distance signal, x, representing the instantaneous horizontal distance extending substantially from said eye position to a predetermined threshold related location upon said runway;

runway threshold circuit means for developing runway threshold imaging data signals corresponding with the image location of said runway threshold substantially as a quotient of the product of said altitude signal, y, and a signal corresponding with said predetermined distance, S, divided by said distance signal, x;

runway end circuit means for developing runway end imaging data signal corresponding with the image location of said runway end substantially as a quotient of the product of said altitude signal, y, and a signal corresponding with said predetermined distance, S, divided by a signal representing the sum of said distance signal, x, and a signal corresponding with said runway length, L; and video processing means responsive to said line generator circuit means output signals, said runway threshold signals, said runway end signals and said timing circuit means horizontal and vertical control signals for deriving video outputs for assertion at said video imaging means.

37. The system of claim 36 in which said second circuit means digital signals representing said vertical location of a vanishing point are developed to locate said point at said display surface a distance of about two inches above the level of said fixed horizontal horizon.

38. The system of claim 36 in which said line generator circuit means comprises:

comparator means having a first input coupled to receive said timing circuit means horizontal scan information and a second input for receiving runway edge image increment signals and having a output for providing said output signals representing the digital correspondence between said first and second inputs;

adder means having a first input for receiving said first circuit means slope signals, a second input for receiving summed slope signals for developing a summation of said signals at said first and second inputs at an output thereof;

data selector means having a first input for receiving said adder means output summed signal and a second input for receiving a signal representing the horizontal position of said vanishing point at said raster and actuable in response to a said second circuit means signal representing vertical locations at said image above said vanishing point to present said vanishing point horizontal position signal at the output thereof and actuable in response to a said second circuit means signal representing vertical locations at said image at and below said vanishing point to present said summed signals at the said output thereof; and memory means having an input for receiving said data selector means selected signals from the said output thereof, and actuable to transfer said received signals to said comparator means second input and to said adder means second input.

39. The system of claim 38 in which said memory means is actuable in response to a said horizontal scan control signal generated by said timing circuit means.

40. The visual display apparatus of claim 6 in which said line generator circuit means comprises:

comparator means having a first input coupled to receive said timing circuit means horizontal scan information and a second input for receiving runway edge position signals and having an output for providing said output signals representing a digital correspondence between said first and second inputs;

adder means having a first input of receiving said first circuit means slope signals, a second input for receiving summed slope signals for developing a summation of said signals at said first and second inputs at an output thereof;

data selector means having a first input for receiving said adder means output summed signal and a second output for receiving a signal representing the horizontal position of said vanishing point at said raster and selectively actuable to present a predetermined one of said first and second inputs at the output thereof for transference to said comparator means second input.

41. The visual display apparatus of claim 40 including means for transferring summed signals at said data selector means output to said adder means second input.

* * * * *